United States Patent [19]
Lozenko et al.

[11] 3,896,349
[45] July 22, 1975

[54] ELECTRIC DRIVE FOR MOTORS INTERCONNECTED TO FORM A RING CIRCUIT

[76] Inventors: Valery Konstantinovich Lozenko, ulitsa Krasny Kazanets, 19, korpus 1, kv. 258; Vladimir Alexandrovich Morozov, ulitsa Krasny Kazanets, 19, korpus 1, kv. 80; Vladimir Serafimovich Pavlikhin, Aviamotornaya ulitsa, 4, korpus 2, kv. 108; Anatoly Mikhailovich Santalov, Chasovaya ulitsa 14, kv. 23, all of Moscow; Leonid Nikolaevich Negodyaev, ulitsa Volodarskogo, 99a, kv. 5; Jury Ivanovich Kiryanov, ulitsa Solidarnosti, 11, kv. 61, both of Kirov, all of U.S.S.R.

[22] Filed: Feb. 27, 1974

[21] Appl. No.: 446,513

[52] U.S. Cl.................................. 318/85; 318/439
[51] Int. Cl........................ H02p 5/46; H02p 7/68
[58] Field of Search........... 318/41, 49, 50, 85, 694, 318/695, 439

[56] References Cited
UNITED STATES PATENTS
3,229,179  1/1966  Hetzel................................ 318/254

*Primary Examiner*—Robert K. Schaefer
*Assistant Examiner*—John J. Feldhaus
*Attorney, Agent, or Firm*—Waters, Schwartz & Nissen

[57] ABSTRACT

This invention relates to electric drives.

An electric drive comprising at least two gate-controlled electric motors, each of said motors comprising a synchronous machine having a rotor position sensor mounted on the shaft thereof, gate switching means provided with gate switch on and off control circuits, the output of said switching means being connected to armature winding sections of the synchronous machine, according to the invention, characterized in that said gate switch on control circuits of each of said gate switching means are connected to one output of the rotor position sensor of each subsequent synchronous machine thereby forming a ring circuit.

This invention may find its use in the fields where stringent requirements are imposed upon synchronization of the electric drives.

15 Claims, 29 Drawing Figures

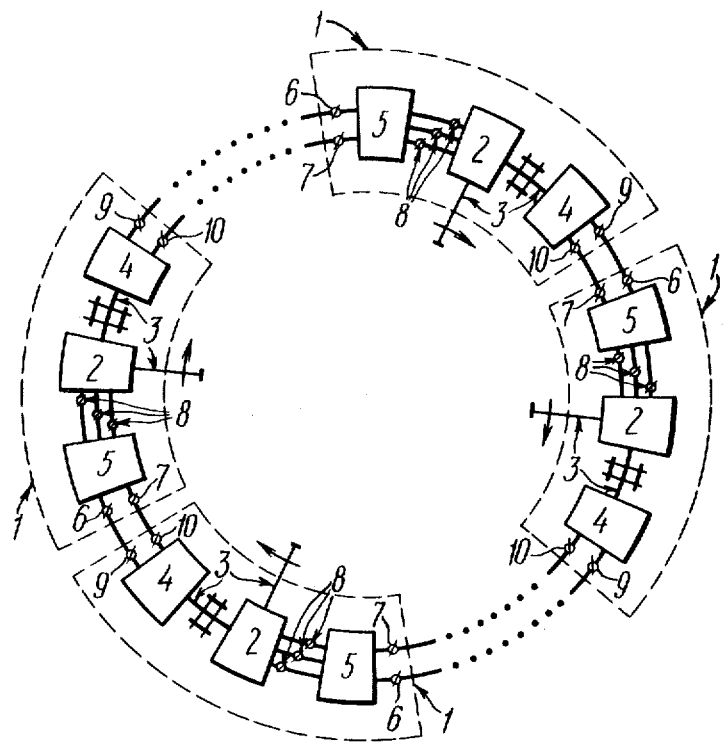
FIG. 1
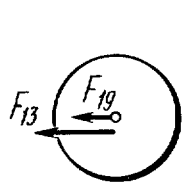 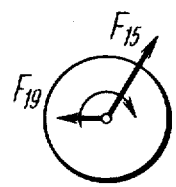 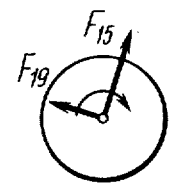 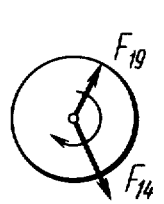
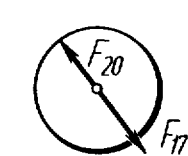 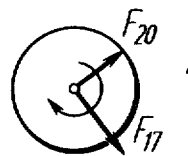 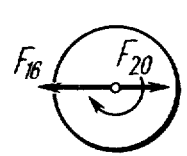 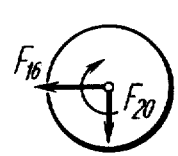
FIG. 4   FIG. 5   FIG. 6   FIG. 7

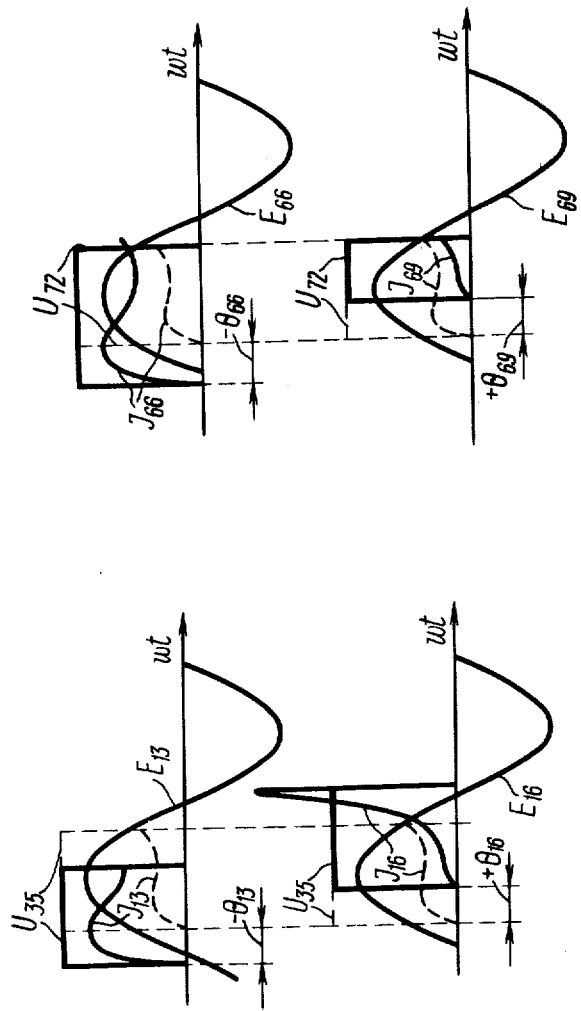
FIG. 9
FIG. 10
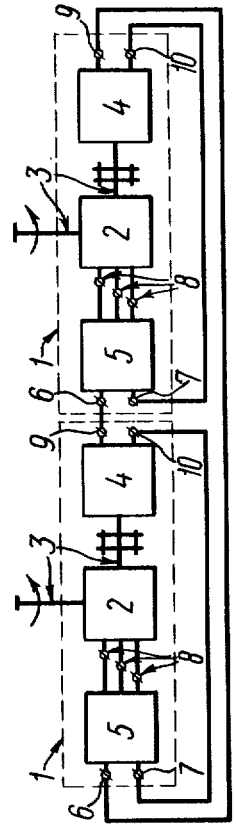
FIG. 12

3,896,349

ELECTRIC DRIVE FOR MOTORS INTERCONNECTED TO FORM A RING CIRCUIT

This invention relates to a co-ordinated electric drive and more particularly to an electric drive comprising at least two gate-controlled electric motors.

At the present time various co-ordinated electric drive systems which are also known as "electric shaft" systems are used to provide synchronous rotation of mechanically uncoupled objects.

Conventionally such systems may be divided into two groups, namely electric shaft systems with auxiliary machines or without the latter.

The systems with auxiliary asynchronous machines are most commonly used in practice. Such systems comprise at least two elements each having an operating electric motor and an auxiliary machine rigidly coupled thereto.

The main disadvantage of the electric shaft system of the type referred to above consists in that they are complex in structure and costly in the manufacture due to the use of the auxiliary asynchronous machines.

The electric shaft systems with auxiliary synchronous machines are used for low-power electric drives which require the synchronous rotation only under steady operating conditions. The main advantages of such systems resides in the fact that an auxiliary synchronous machine develops very low torque at low rotational speed. This disadvantage of the system appreciably restricts the field of its application.

Also known in the art are electric shaft systems with an adjustable driving motor having, mounted on the shaft thereof, an auxiliary asynchronous machine with phase-wound rotor. Driven asynchronous motors have their stator windings connected to a source of supply and their rotor windings connected to rotor windings of the auxiliary machine. With such a system the synchronous rotation may be ensured both undere steady operation conditions as well as in a transitional regime with different loading torques at individual electric motors. The disadvantages of the electric shaft system with a driving motor resides in the fact that the power of the driving motor should be equal to the sum of powers of an auxiliary machine and that of the driven electric motors.

The second groups of the electric shaft systems, i.e. of the systems without the auxiliary machines, is much more simple than those mentioned above. In its simplest form the electric shaft system comprises two asynchronous motors having their stator windings connected to a power source and their rotor windings interconnected in parallel. Synchronous rotation of the electric motor rotors is ensured only at equal loading starting torques. In case when the equality in loading torques is broken, the synchronism will be lost. It is just the reason why the electric shaft system of this kind is out of practical use.

A parallel connection of variable resistor to the rotor windings is used to improve operational stability of this sytem. However, this fact has a detrimental effect on the power performance of the system.

A synchronous electric drive with direct-current commutating machines consists of two direct-current shunt-excitation machines, each having additional branches from the armature windings to three rings. The synchronous rotation is achieved due to an electric interconnection between said rings of the first machine and that of the second machine respectively. To improve the operation of the system, cross connection between field windings or series connection between electric motors in the armature circuit are used for electric motors of series excitation.

A disadvantage of the electric drives with direct-current machines resides in lack of synchronism at the start and at the end of the braking period. Furthermore, the systems with direct-current commutating machines tend, such like synchronous frequency convertors, to go out of synchronism at a sudden change of load.

Also known in the art are electric drives with gate-controlled electric motors, the sections of armature windings of their synchronous machines being connected in series to each other and to the output of the gate switching means. Gate switching means turn on and off control circuits may be connected to a special frequency setter or to a rotor position sensor of the most loaded motor.

The electric drives of the first type have a tendency to go out of synchronism at a sudden change in load while the electric drives of the second type have very limited application due to the fact that it is not so often found in practice that one of the electric motors in the electric drive system should always undergo greater loading torque than the others, and this feature comprises another disadvantage of the conventional electric drives.

The object of this invention is to provide an electric drive which ensures, within a wide range of loads and with adequate power performance, conditions for steady synchronous rotation of at least two gate-controlled uncoupled mechanically electric motors and for control of the operation of the electric drive as a whole by acting only on one of said gate-controlled motors.

This object is accomplished by the fact that in electric drive comprising at least two gate-controlled electric motors with each of said motors including a synchronous machine having a rotor position sensor attached to the shaft of the machine and gate switching means having gate switch on and off control circuits, the output of said switching means being connected to sections of armature windings of said synchronous machine, according to the invention, said gate switch on control circuits for each gate switching means are connected to one output of the rotor position sensor in each subsequent synchronous machine, thereby forming a ring circuit.

It is expedient to connect said gate switch off control circuits to the second output of the rotor position sensor in each subsequent synchronous machine, thereby also forming a ring circuit. This feature makes it possible to create ring circuits with the use of commercially available gate-controlled electric motors without any structural modifications.

It is also advisable to connect said gate switch off control circuits of the gate switching means to the second output of the rotor position sensor of its own synchronous machine. This feature contributes to a considerable increase of the electric drive efficiency.

It is also expedient to provide the electric drive, wherein each gate-controlled electric motor has a speed governor with module-based and sign-based phase-difference detector for signals of the rotor position sensors in each pair of correlated synchronous machines, said detectors being in amount of $m(m-1)/2$, the output of each of said module-based phase-difference detectors being connected to inputs of two speed governors in correlated synchronous machines through controlled gates, while the inputs of said gates are connected to another two outputs of said sign-based phase-difference detector, wherein "$m$" is a number of the gate-controlled electric motors. This feature is multipurpose and increases the efficiency of any gate-controlled electric motor irrespective of its structural and schematic representation.

It is expedient to connect said gate switch on and off control circuits for each gate switching means respectively to the first and the second outputs of the rotor position sensor in each subsequent synchronous machine, said connection being accomplished through normally closed circuits of two-position multichannel relay, and to connect said control circuits to the first and second outputs of the rotor position sensor of its own synchronous machine through normally opened circuits of said relay. This feature makes it possible to increase the reliability of the electric drive.

It is expedient to connect a relay control circuit to a square-wave pulse generator, thereby improving the starting characteristics of the electric drive and ensuring the pulse synchronization for the rotational speed of the electric motors.

It is also possible to connect the relay control circuit to a controlled-parameter sensor of each gate-controlled electric motor, said parameter being controlled e.g. by current. This feature makes it possible to create reliable overload-protecting circuits for electric motors.

It is advantageous to provide each of said gate-controlled electric motors with a controlled two-position multichannel relay and through normally closed circuits of said relay to connect the gate switch on and off control circuits for each switching means to the first and the second outputs of the rotor position sensor in each subsequent synchronous machine, thereby forming a ring circuit of m-motor electric drive (i.e. drive comprising $m$ motors) and through normally opened circuits of said relay to connect said gate switch on and off control circuits for each switching means to the first and the second output of the rotor position sensor in its own synchronous machine, and also to connect the first and the second outputs of said rotor position sensor of the subsequent machine to the gate switch on and off control circuits of the preceding synchronous machine, thereby forming a ring circuit of ($m-1$)-motor electric drive. This feature of the invention makes it possible to create a selective mode of protection for electric motors, to detect and exclude from the ring circuit a damaged electric motor while maintaining operable the rest motors included in the circuit.

It is also expedient to connect the control circuit of each relay to an output of a coincidence circuit, one input of said coincidence circuit being connected through a threshold element to a sensor of a controlled paramter (said parameter being controlled e.g. by a rotational speed of the gate-controlled electric motor), and also to connect the second input of said coincidence circuit to an output of the sign-based phase-difference detectors which detect phase-difference signals from the rotor position sensor of the rotor of the synchronous machine delayed by phase.

The electric drive according to the invention is characterized by the following advantages:

1. It ensures starting and unidirectional rotation of gate-controlled electric motors, the rotors rotating synchronously within a wide range of loading torques;

2. Control and stabilization of the speed during the operation of gate-controlled electric motors are achieved by acting only on one of said motors;

3. Automatic control of input power for gate-controlled electric motors is carried out as a function of the load;

4. If necessary, the electric drive may be switched from a circuit with synchronous rotation of the gate-controlled electric motors to that of the locally-closed type;

5. In the case of failure, the damaged gate-controlled electric motor is excluded while the rest of the motors are kept operable.

The electric drive according to the invention may find its use in textile, paper-making, aircraft, metallurgical, chemical industries, as well as in the field of cinematographic television, and tape-recording techniques.

The invention will now be explained in greater detail with reference to embodiments thereof which are represented in the accompanying drawings, wherein:

FIG. 1 is a block diagram of an electric drive made according to the invention and comprising $m$ gate-controlled electric motors;

FIG. 4 shows diagrams illustrating the relative positions betwen magnetizing forces of armature windings and permanent magnets during the starting of the electric drive shown in FIG. 3;

FIG. 5 is the same diagram as shown in FIG. 4 but with another section switched on;

FIG. 6 is the same diagram as shown in FIG. 4 but with the next section switched on;

FIG. 7 is the same diagram as shown in FIG. 4 but with the following section switched on;

FIG. 9 shows graphs illustrating a voltage supplied to armature winding sections, counter electromotive forces induced in these sections and current flowing through the electric drive shown in FIG. 3;

FIG. 10 is a block diagram of an electric drive with two gate-controlled electric motors having their gate switch off control circuits connected to the second outputs of the rotor position sensor of its own synchronous machine;

FIG. 12 is the same diagram as shown in FIG. 9 but associated with the electric drive shown in block-diagram view in FIG. 11;

FIG. 16 shows the same charts as shown in FIG. 15 but with the speed governors switched on;

Figure 2:
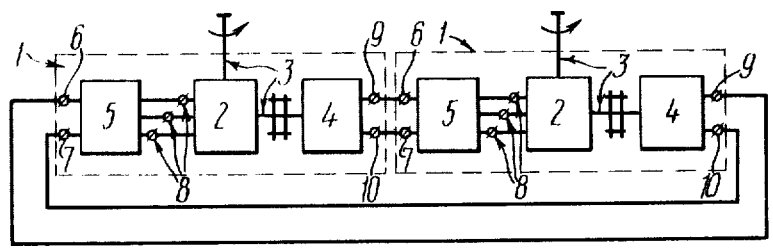
FIG. 2 is a block diagram of an electric drive consisting of two gate-controlled electric motors.

According to the invention, an electric drive comprises at least two, and in general case $m$ gate-controlled electric motors 1 (FIG. 1), each of said motors comprising a multiphase synchronous machine 2 having a rotor position sensor 4 mounted on the shaft thereof and a gate switching means 5 provided with gate switch on and off control circuits 6 and 7 respectively. An output 8 of each gate switching means 1 is connected to armature winding sections of the synchronous machine 2. The gate switch on control circuits for gates of the switching means 1 are connected at least to the first output 9 of the rotor position sensor 4 in each subsequent synchronous machine 2, thereby forming a ring circuit. In FIG. 1 there is shown an embodiment of the invention, wherein the gate switch off circuits 7 of the switching means 5 are connected to the second output 10 of the rotor position sensor 4 in each subsequent synchronous machine 2, thereby forming a ring circuit. Only one gate switch on control circuit 6 and one gate switch off control circuit 7 for the switching means 5 as well as only one first output 9 and one second output 10 for the rotor position sensor 4 are shown in FIG. 1. In practice, the number of said circuits and the number of the outputs are equal to each other and to the number of the gates in the switching means, said number being determined by the particular structure of said switching means.

FIG. 2 illustrates an embodiment of the invention, wherein an electric drive consists of two gate-controlled electric motors. The reference numerals and connections used in FIG. 2 are identical to those in FIG. 1.

Figure 3:
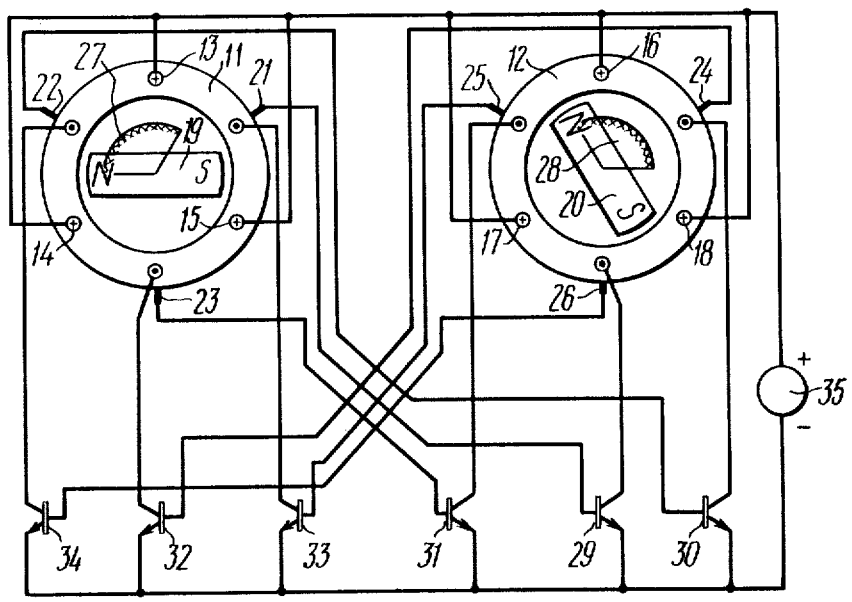
FIG. 3 is a connection diagram for an electric drive with two three-phase magneto-electric gate-controlled electric motors provided with control from half-wave switching means.

FIG. 3 illustrates a connection diagram for two three-phase magneto-electric synchronous machines and rotor position sensors. In this case the simplest circuits of half-wave switches with three transistor gates are used as gate switching means diametral windings 13, 14, 15, 16, 17 and 18 respectively and inductors in the form of bipolar magnets 19 and 20 are accommodated in the slots provided in stators 11 and 12 of the first and the second synchronous machines repsectively. The rotor position sensors are composed of sensing elements 21, 22, 23 and 24, 25, 26 according to the number of gates (sections) and signal sectors 27 and 28 with angle dimension 120°, said sectors being rotated together with the inductors. The sensing elements 21, 22, 23 in the switch on and off control circuits (in this case said circuits are integrated) are connected to gates 29, 30, 31 switching the sections 16, 17, 18 accommodated in the stator 12 of the second synchronous machine, while the sensing elements 24, 25, 26 are connected to gates 32, 33, 34 used to switch the sections 13, 14, 24 accommodated in the stator 11 of the first synchronous machine thereby forming a ring circuit.

Figure 8:
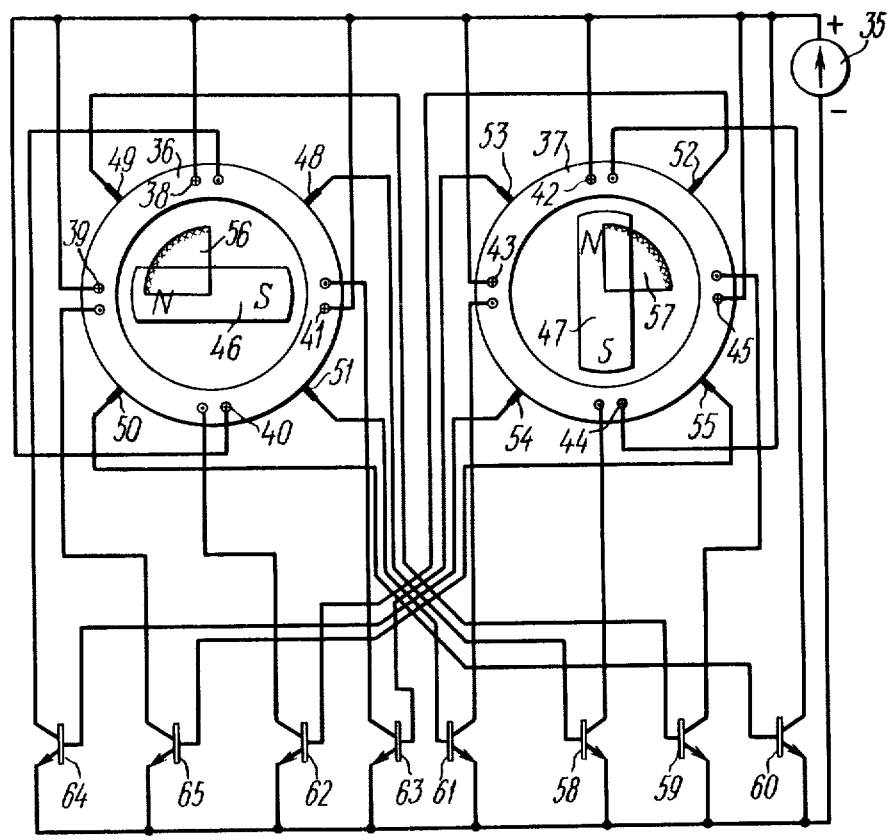
FIG. 8 is the same diagram as shown in FIG. 3 but with the use of four-phase gate-controlled electric motors.

In FIGS. 4–7 there are shown diagrams illustrating the relative position between magnetizing forces F of armature winding sections, such as the forces $F_{13}$, and magnetizing forces of permanent magnets, such as the force $F_{19}$, at the start of the electric drive shown in FIG. 3. FIG. 8 shows an electric diagram for two four-phase magneto-electric synchronous machines and rotor position sensors. Circuits of four-phase half-wave switches with four transistor gates in this diagram are shown as gate switching means. The first and the second synchronous machines comprise stators 36 and 37 accommodating in the slots thereof the sections of four-phase diametric windings 38, 39, 40, 41 and 42, 43, 44, 45 respectively and inductors in the form of bipolar magnets 46 and 47. The rotor position sensors consist of sensing elements 48, 49, 50, 51 and 52, 53, 54, 55 according to the number of gates (sections) and signal sectors 56 and 57 with angle dimension 90°, said sectors being rotated together with the inductors. The sensing elements 48, 49, 50, 51 in the switch on and off control circuits (in this case said circuits are integrated) are connected to gates 58, 59, 60, 61 switching the sections 42, 43, 44, 45 accommodated in the stator 37 of the second synchronous machine, while the sensing elements 52, 53, 54, 55 are connected to gates 62, 63, 64, 65 used to switch the sections 38, 39, 40, 41 accommodated in the stator 36 of the first synchronous machine, thereby forming a ring circuit for the electric drive.

FIG. 9 shows characteristics of a voltage U applied to the armature winding sections, counter electromotive forces E (e.g. $E_{13}$) induced in said sections and a current (such as $I_{13}$) e.g. flowing through the electric drive illustrated in FIG. 3. The inferior figures used with symbols F, U, E, I indicate their relation to appropriate reference numerals of the drawings.

In FIG. 10 there is shown an embodiment, wherein an electric drive consists of two gate-controlled electric motors. The reference numerals used in FIG. 10 are identical to those used in FIG. 2. The gate switch on control circuits 6 for the gates of each gate switching means 5 are connected to the first output 9 of the rotor position sensor 4 in each subsequent synchronous machine 2, thereby forming a ring circuit. The gate switch off control circuits 7 for the gates of each gate switching means 5 are connected to the second output 10 of the rotor position sensor 4 in its own synchronous machine 2.

Figure 11:
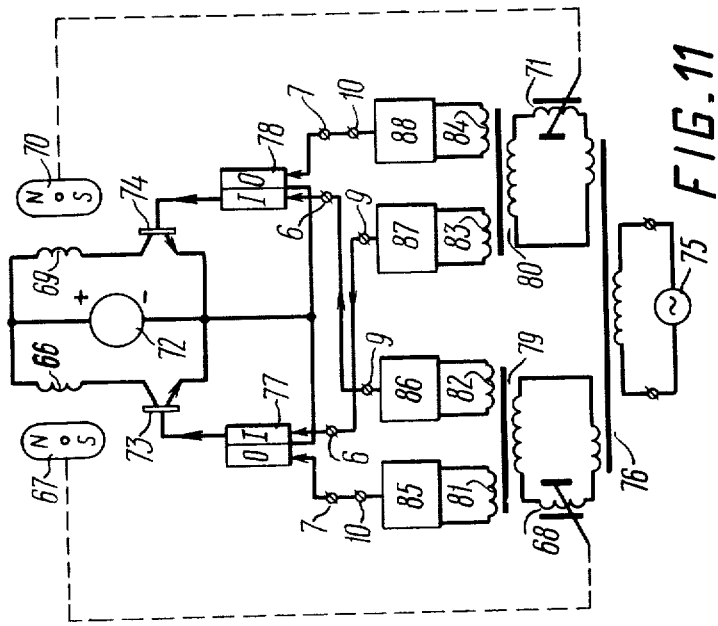
FIG. 11 shows a schematic representation of the electric drive illustrated in FIG. 10 in a block-diagram view.

FIG. 11 illustrates one possible schematic representation of the electric drive shown in the block diagram view in FIG. 10. For the sake of simplicity and clarity of the description only a portion of the device for two sections of different electric motors is shown, the other parts of the device being identical. The first gate-controlled electric motor combines in its structure a synchronous machine with an armature winding section 66 and inductor in the form of a permanent magnet 67 and a rotor position sensor with an inductive sensing element 68. The same units of the second gate-controlled electric motor are indicated by the reference numerals 69, 70, 71 respectively. The sections 66 and 69 of the electric motors are connected to a source 72 of power supply via gates 73 and 74 of the gate switching means. The inductive elements 68 and 71 are fed from a high-frequency variable-voltage generator 75 through a transformer 76. The gate switch on control circuit 6 for the gates 73 and 74 are connected to the first output 9 of the inductive rotor position sensors 71 and 68 respectively, thereby forming a ring circuit for the electric drive. The gate switch off control circuits 7 for the gates 73 and 74 are connected to the second outputs 10 of the inductive rotor position sensors 68 and 71 of its own synchronous machines. The gate switch off control circuits 6 and the gate switch off control circuits 7 for the gates 73 and 74 are in the form of triggers 77 and 78 having two stable states, i.e. state "1" and state "0". The first output 9 and the second output 10 from the inductive rotor position sensors 68 and 71 are made in the form of matching transformers 79 and 80, the secondary winding of these transformers being connected to control pulse leading and trailing edge shapers 85, 86, 87 and 88. The pulse shapers 86 and 87 are used to control pulse leading edge shapers, while the shapers 85 and 86 are used as control pulse trailing edge shapers.

FIG. 12 shows curves characterizing the voltage U fed to the armature winding sections, counter electromotive force E induced in said sections and a current I in the electric drive shown in FIG. 11.

Figure 13:
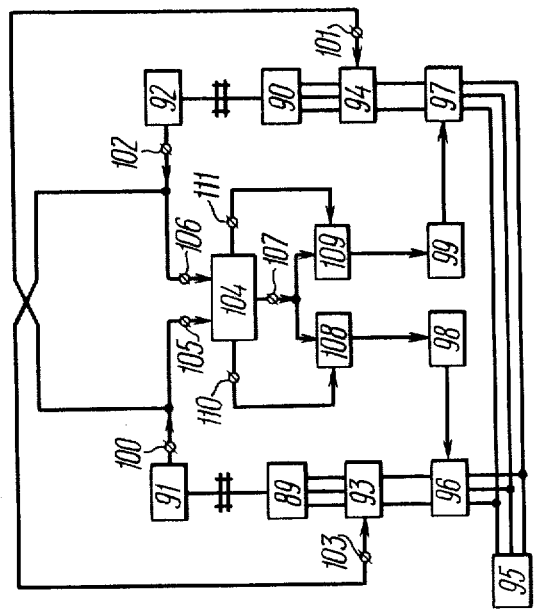
FIG. 13 shows a block diagram of an electric drive with two gate-controlled electric motors provided with rotational speed governors in the form of supply voltage adjustment devices.

FIG. 13 illustrates another embodiment of the invention where an electric drive consists of two gate-controlled electric motors, each provided with speed governor made in the form of supply voltage adjusting means. The first and the second gate-controlled electric motors comprise synchronous machines 89 and 90 provided with rotor position sensors 91 and 92 mounted on their shafts and gate switching means 93 and 94 connected to a three-phase power supply line 95 through speed governors made in the form of controlled rectifiers 96 and 97 having control circuits 98 and 99.

An output 100 of the sensor 91 is connected to an input 101 of the switching means 94 while an output 102 of the sensor 92 is connected to an input 103 of the switching means 93, thereby forming a ring circuit of the two-motor electric drive. Herein and below, if not specified, for the sake of clarity of the description, the first and the second outputs from the sensors as well as gate switch on and off control circuits are integrated by common outputs of the sensors and by common inputs of the switching means.

The electric drive is provided with a module-based and sign-based phase-difference detector 104 for signals generated by the rotor position sensors of the synchronous machines. Inputs 105 and 106 of the detector 104 are connected to outputs 100 and 102 of the sensors 91 and 92. An output 107 of the module-based detector 104 is connected to the control circuits 98 and 99 of the rectifiers 96 and 97 via controlled gates 108 and 109 having their inputs connected to other two outputs 110 and 111 of the sign-based phase-difference detector.

The sign-based phase-difference detector may comprise a logic unit composed of two triggers.

The sign-based phase-difference detector may comprise a logic unit consisting of two triggers and two coincidence circuits. The device of such kind records a phase-difference sign for two pulse train. The state of the output trigger in the device depends on the phase-difference sign. With difference frequencies of input signals the state of the output trigger will depend on the sign of their difference.

Let us assume that with the rotational frequency $f_{89}$ of the synchronous machine 89 greater than the rotational frequency $f_{90}$ of the synchronous machine 90, a voltage appears at the output 110 of the sign-based detector, while a zero potential appears at the output 111, and vice versa, provided that $f_{89} < f_{90}$, the zero potential will be registered at the output 110 while the voltage will be registered at the output 111. When frequencies are equal, i.e. $f_{89} = f_{90}$, the detector determines the phase-difference sign for these frequencies. If the pulses $f_{89}$ are delayed with respect to the pulses $f_{90}$, then the voltage will be registered at the output 111, and vice versa, if the pulses $f_{90}$ are delayed with respect to the pulses $f_{89}$, then the voltage will be discovered at the output 110. Any other suitable diagram known in the art may be used for a sign-based detector of two different frequencies.

A module-based detector for two different frequencies may comprise, two resistors having a common point. With a voltage supplied from the sensors to these resistors, a voltage will appear at the uncoupled ends thereof, said voltage being in proportion to a phase difference between the applied signals. If a variable voltage is supplied from the sensors, then by means of demodulators said voltage may be rectified in order to determine the module-base difference between said signals.

When cophasal signals are fed from the sensors 91 and 92, there will be no phase-based difference at the output 107 of the detector.

Figure 14:
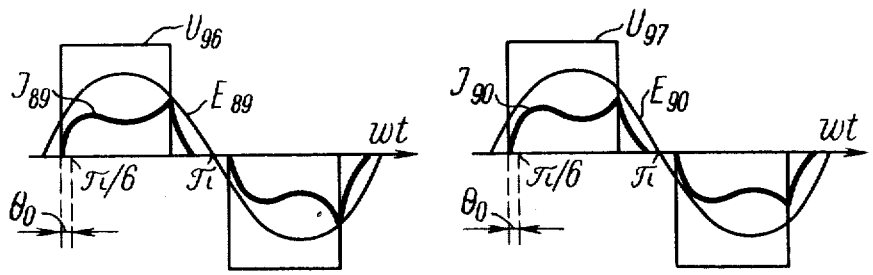
FIG. 14 shows graphs illustrating a supply voltage, counter electromotive forces and current flowing through armature winding sections of the electric drive shown in FIG. 13, the electric motors in said drive being loaded by equal torques.
Figure 15:
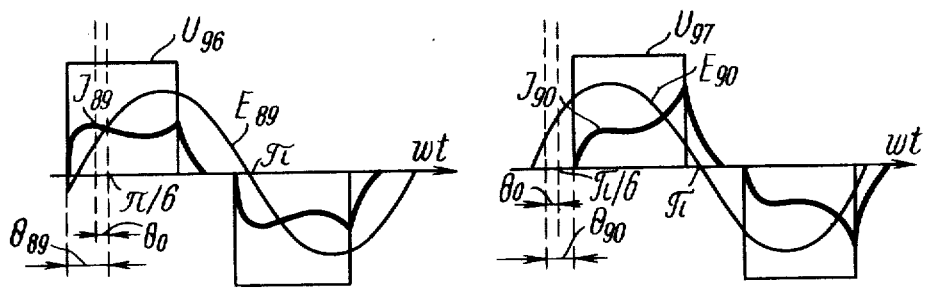
FIG. 15 shows the same graphs as shown in FIG. 14 but in the case when the electric motors are under different torques and with the speed governors switched off.
Figure 16:
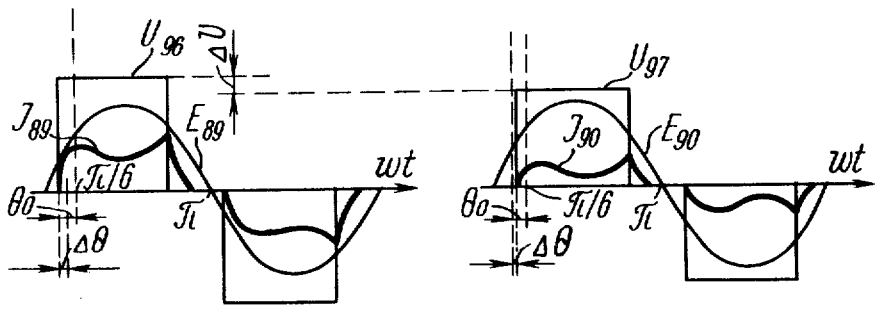

FIGS. 14–16 show curves characterizing a supply voltage U fed to the armature winding sections, counter electromotive forces E induced in said sections and a current I, the curves illustrating various operation conditions for the electric drive shown in FIG. 13.

Figure 17:
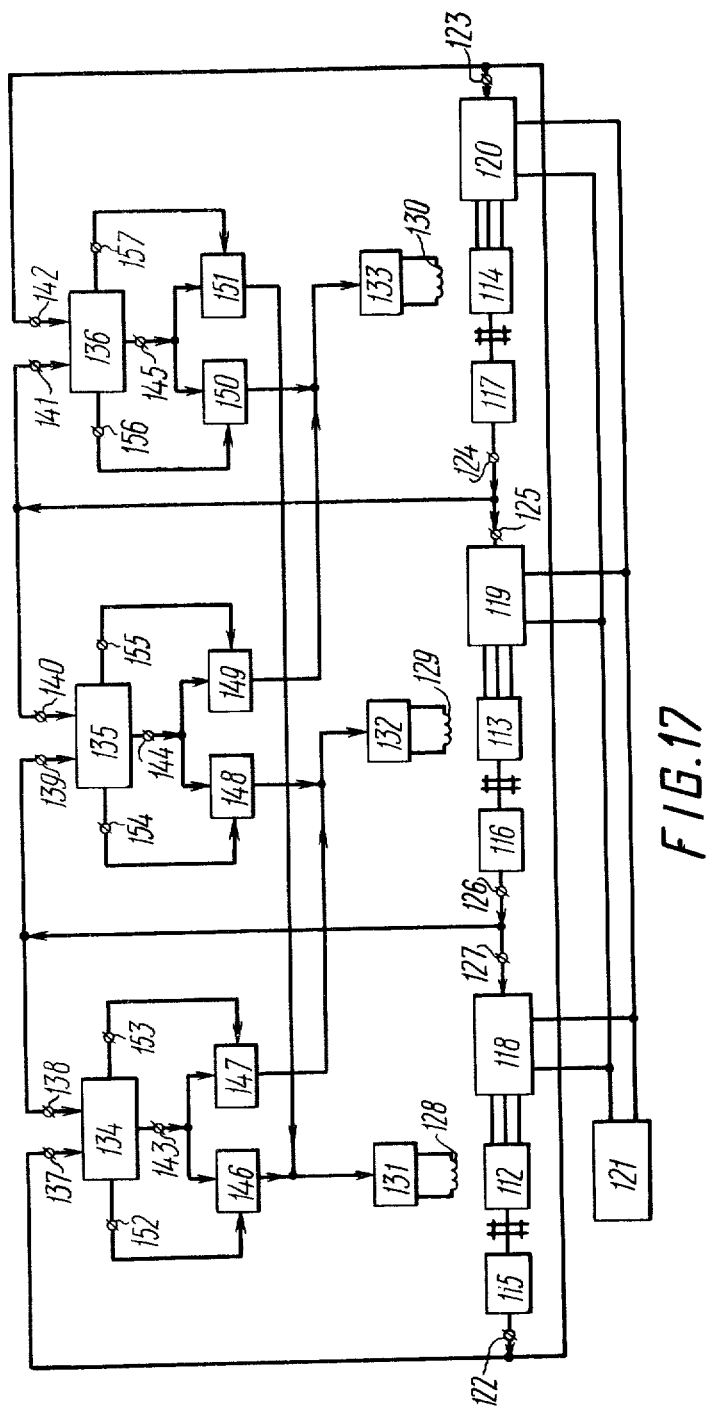
FIG. 17 is a block diagram of an electric drive with three gate-controlled electric motors, each provided with rotational speed governor in the form of a current adjusting device for field windings of a synchronous machine.

Another embodiment of the invention is shown in FIG. 17, wherein the electric drive consists of three gate-controlled electric motors, each provided with a speed governor made in the form of a current adjusting device included in the field winding circuit of the synchronous machine. The gate-controlled electric motors comprise the synchronous machines 112, 113 and 114 having sensors 115, 116 and 117 and gate switching means 118, 119 and 120 connected to a direct current supply line 121. An output 122 of the sensor 115 is connected to an input 123 of the switching means 120, an output 124 of the sensor 117 is connected to an input 125 of the switching means 119, while an output 126 of the sensor 116 is connected to an input 127 of the switching means 118, thereby forming a ring circuit for the electric drive consisting of three electric motors.

Current adjusting devices 131, 132, 133 are included in field winding circuits 128, 129 and 130 of the synchronous machines 112, 113 and 114. The electric drive is provided with three module-based and sign-based phase-difference detectors for signals generated by rotary position sensors in each pair of the synchronous machines. Inputs 137–142 of the detectors are connected to outputs of the rotor position sensors, namely, the inputs 137 and 142 are connected to the output 122 of the sensor 115, the inputs 138 and 139 are connected to the output 126 of the sensor 116 and the inputs 140 and 141 are connected to the output of the sensor 117. At the same time, outputs 143, 144 and 145 of the module-based detectors 134, 135, 136 are connected to the current adjusting devices via controlled gates 146, 147, 148, 149, 150, 151, an output of each module-based detector, such as that of the detector 143, being connected to inputs of two current adjusting devices (speed governors) of the correlated synchronous machines 112 and 113 through the controlled gates 146 and 147. Other electric connections are the same. Inputs of the controlled gates 146–151 are connected to outputs of the sign-based detectors.

All the logic units of this device are similar to those described above in relation to the device shown in FIG. 13 and perform the same functions in the same sequence. Thus, if pulses $f_{112}$ from the sensor 115 of the synchronous machine 112 lag behind pulses $f_{113}$ of the synchronous machine 113, the voltages induced at the output 153 of the sign-based detector will switch on the controlled gate 147 with the result that the signal from the output 143 of the detector will be fed to the current adjusting device 132, said signal being equal to module to the difference between the signals $f_{112}$ and $f_{113}$.

Figure 18:
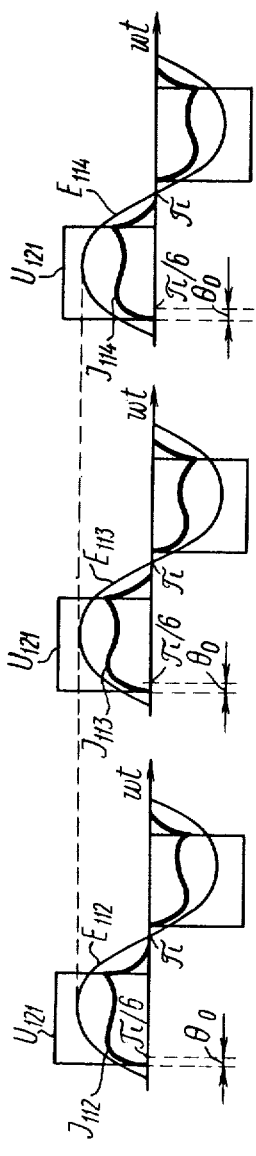
FIG. 18 shows the same graphs as shown in FIG. 14 but associated with the electric drive shown in FIG. 17.
Figure 19:
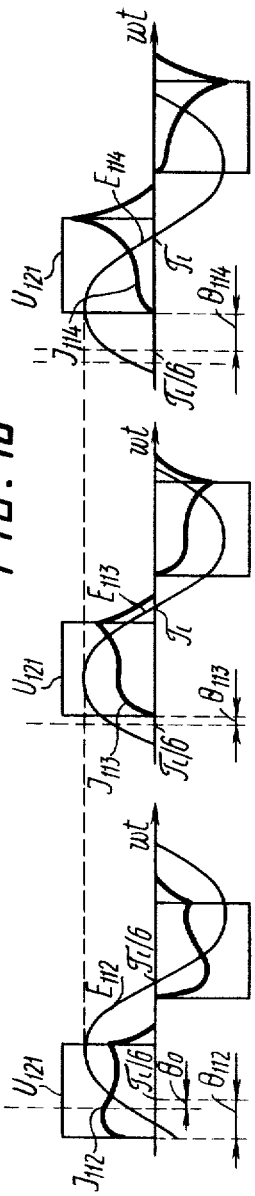
FIG. 19 shows the same graphs as shown in FIG. 15 but associated with the electric drive illustrated in FIG. 17.
Figure 20:
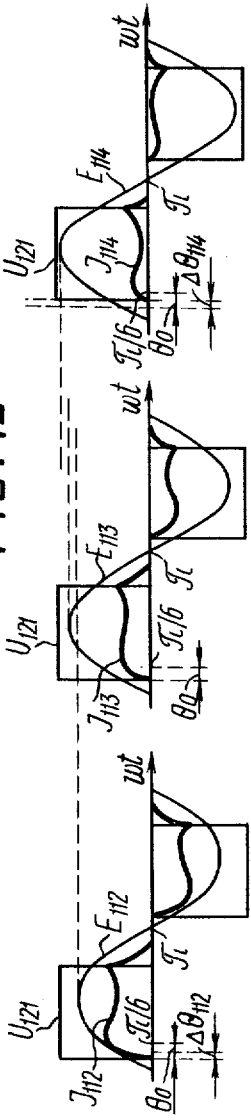
FIG. 20 shows the same graphs as shown in FIG. 16 but associated with the electric drive illustrated in FIG. 17.

FIGS. 18–20 show curves illustrating a supply voltage U fed to the armature winding sections, counter electromotive forces E induced in said sections and a current I, said curves characterizing various operating conditions for the electric drive shown in FIG. 17.

Figure 21:
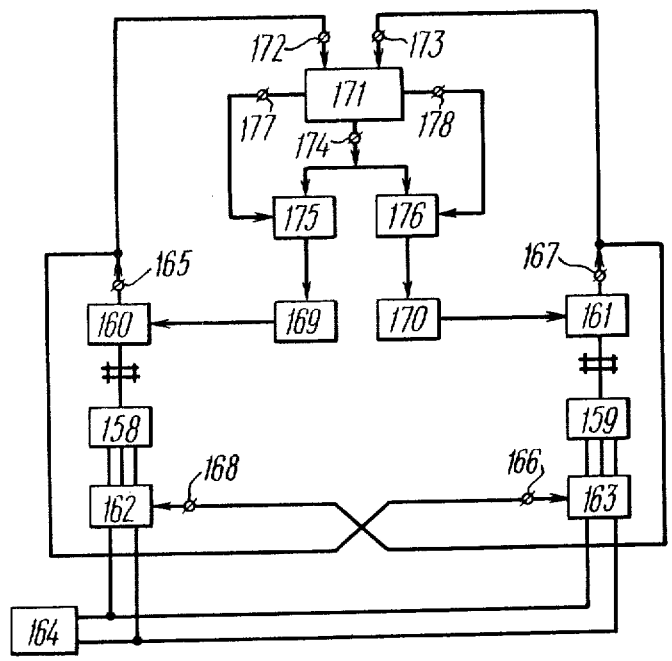
FIG. 21 is the same charts as shown in FIG. 14 but for an electric drive having speed governors made in the form of voltage adjusting devices in the rotor position sensor control circuit, said sensors providing a phase shift of the output signals.

Still another embodiment of the invention is shown in FIG. 21, wherein an electric drive consists of two gate-controlled electric motors, each provided with speed governor in the form of a voltage adjusting device included in the control circuit of the rotor position sensor adapted to give a phase difference in output signals. The gate-controlled motors comprise synchronous machines 158 and 159 having rotor position sensors 160 and 161 adapted to give a phase-difference in output signals and gate switching means 162 and 163 connected to a direct current suply line 164. An output of the sensor 160 is connected at an input 166 of the switching means 163 while an output 167 of the sensor 161 is connected to an input 168 of the switching means 162, thereby forming a ring circuit composed of two motors. Voltage adjusting devices 169 and 170 in control circuits of the sensors 160 and 161 ensure the adjustment of phase difference of signals at the outputs of the sensors. The electric drive is provided with a sign-based and module-based phase-difference detector 171 with inputs 172 and 173 of this detector being connected to outputs 165 and 167 of the sensors 160 and 161. An output 174 of the module-based detector 171 is connected to the voltage adjusting devices 169 and 170 via controlled gates 175 and 176 with inputs of said gates being connected to the other two outputs 177 and 178 of the sign-based detector.

Figure 22:
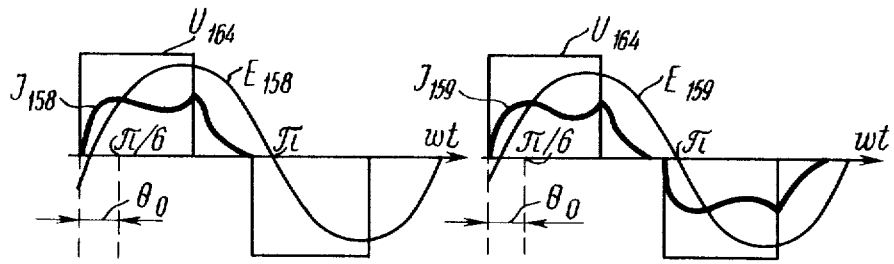
FIG. 22 shows the same graphs as shown in FIG. 14 but associated with the electric drive illustrated in FIG. 21.
Figure 23:
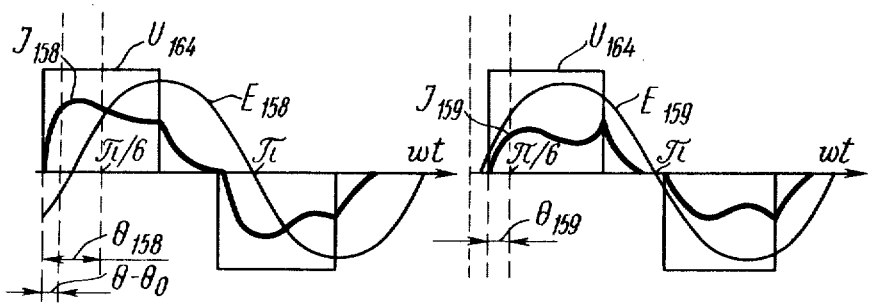
FIG. 23 shows the same graphs as shown in FIG. 15 but associated with the electric drive illustrated in FIG. 21.
Figure 24:
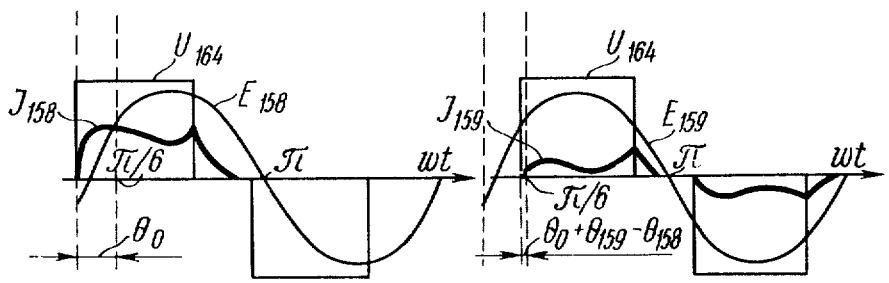
FIG. 24 shows the same graphs as shown in FIG. 16 but associated with the electric drive illustrated in FIG. 21.

FIGS. 22–24 illustrate curves characterizing a supply voltage U fed to the armature winding sections, counter electromotive forces E induced in said sections and a current I running therethrough, said curves illustrating various operating conditions for the electric drive shown in FIG. 21.

Figure 25:
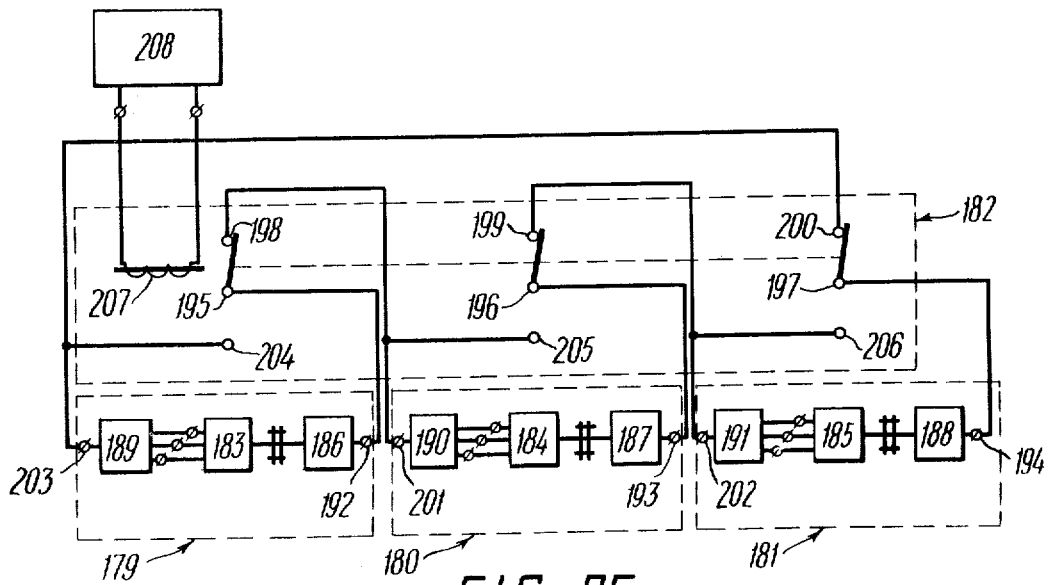
FIG. 25 is a block diagram of an electric drive with three gate-controlled electric motors, said drive being provided with a two-position multichannel controlled relay.

FIG. 25 illustrates a block diagram for an electric drive comprising three gate-controlled electric motors 179, 180 and 181, said electric drive being provided with a twoposition multichannel relay 182.

The gate-controlled electric motors 179, 180 and 181 comprise synchronous machines 183, 184 185 with rotor position sensors 186, 187 and 188 and gate switching means 189, 190 and 191. Outputs 192, 193 and 194 of the rotor position sensors 186, 187 and 188 are connected to terminals 195, 196 and 197 of the relay 182 with normally closed contacts 198, 199 and 200 of this relay being connected respectively to inputs 201, 202 and 203 of the gate switching means 190, 191 and 189, thereby forming a ring circuit completed through the normally closed circuits in the electric drive consisting of three electric motors. Normally opened contacts 204, 205 and 206 of the relay 182 are connected respectively to the inputs 203, 201 and 202 of the switching means 189, 190 and 191. A control winding 182 is included into the circuit of a control device 208.

Figure 26:
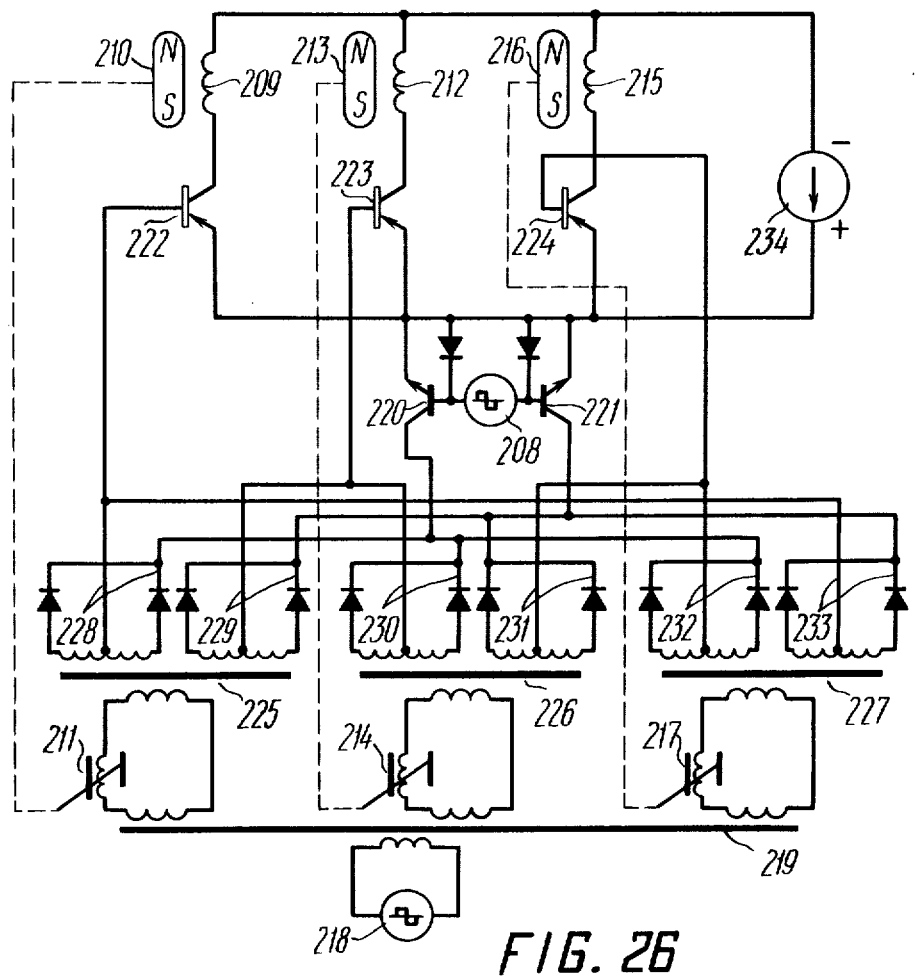
FIG. 26 is a schematic representation of a two-position multichannel controlled relay with the use of semiconductor elements in half-wave circuits of switching means.

Still another possible embodiment of a simple two-position semiconductor-controlled multichannel relay for halfwave switching circuits is shown in FIG. 26. For the sake of simplicity and clarity of the description there is shown only a portion of the device for three sections of different electric motors. The relay is simplified for all the sections. Structurally the first gate-controlled-electric motor comprises a synchronous machine having an armature windind 209, a rotor in the form of a permanent magnet 210 and a rotor position sensor with an inductive sensing element 211. Reference numerals for the corresponding units of the second and the third electric motors will be 212, 213, 214 and 215, 216 and 217 respectively. The inductive sensors 211, 214 and 217 are fed from a high-frequency variable-voltage generator 218 via a transformer 219. The relay consists basically of two transistors 220, and 221. The sensors 211, 214 and 217 are connected to gates 222, 223 and 224 (transistors) of the switching means via matching transformers 225, 226, 227 and the transistors 220 and 221 of the relay. Each of the matching transformers 225, 226 and 227 comprises two output circuits made according to a "source-rectifier" circuit with midpoint: 228 and 229, 230 and 231, 232 and 233. Positive terminals of the sources 229, 231 and 233 are coupled and connected to a collector of the normally conductive transistor 221 of the relay. Positive terminals of the sources 228, 230 and 232 are also interconnected and connected to a collector of the normally blocked transistor 220 of the relay. Negative terminals of the sources are connected in pairs as 223 to 228, 223 to 230, 231 to 232 and connected respectively to conrol circuits of the transistors 222, 223 and 224 adapted to switch the sections 209, 212 and 215 of the motors with respect to the source of supply 234. Emitters of the transistors 220 and 221 are connected to a terminal which is a common one for power and control circuits of the transistors 222, 223 and 224. The control circuits of the transistors 220 and 221 (the relay input) are connected to a control device 208.

Figure 27:
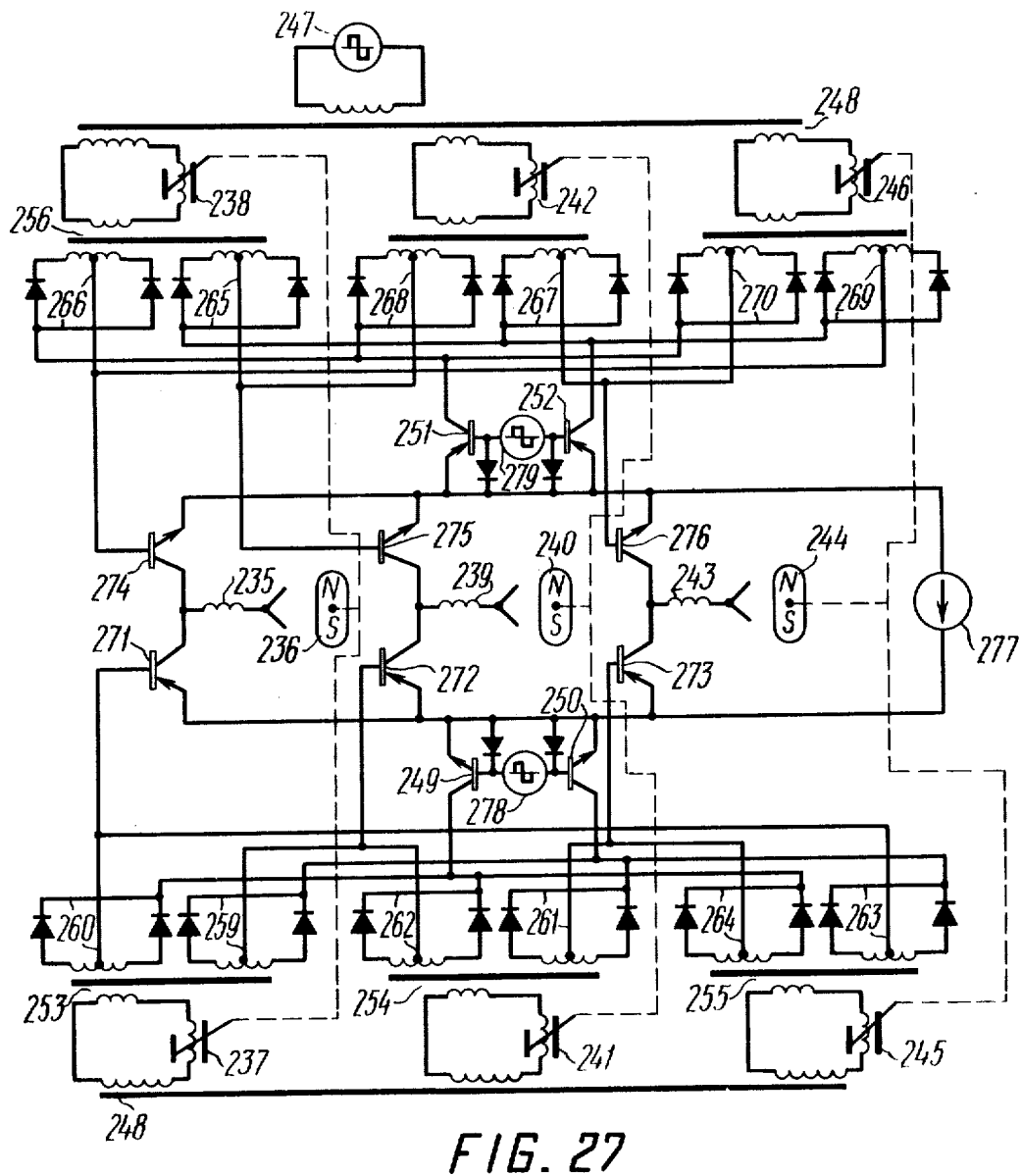
FIG. 27 is the same diagram as shown in FIG. 26 but associated with full-wave circuits of switching means.

Another possible embodiment of a simple two-position semiconductor-controlled multichannel relay for full-wave switching circuits is shown in FIG. 27, gates of said circuits in different branches of a bridge having transistors of different junctions, i.e. pnp and npn transistors. For the sake of simplicity of the description only a portion of the device is shown for three sections of the different electric motors. The diagram is simplified for all sections of the relay. Structurally the first gate-controlled electric motor comprises an armature winding section 235, a rotor in the form of a permanent magnet 236 and sensitive elements 237 and 238 of the rotor position sensor. The same elements of the second and the third electric motors are indicated respectively as 239, 240, 241, 242 and 243, 244, 245, 246. The sensitive elements 237, 238, 241, 242, 245 and 246 of the sensors are fed from a high-frequency variable-voltage generator 247 via a transformer 248. The relay consists of two pairs of transistors 249, 250 and 251, 252. Switch control signals are supplied from matching transformers 253, 254, 255 and 256, 257, 258 via the transistors. Each of said matching transformers comprises two output circuits made according to a source-rectifier circuit with a midpoint: 259–260, 262–262, 263–264, 265–266, 267–268, 269–270. Positive terminals of the sources 260, 262 and 264 are interconnected and connected to a collector of the normally blocked transistor 249. Positive terminals of the sources 259, 261 and 263 are also interconnected and connected to a collector of the normally conductive transistor 250. Negative terminals of the sources are connected in pairs as 263 to 260, 259 to 262, 261 to 264 and included respectively in control circuits of the transistors 271, 272 and 273. Negative terminals of the sources 266, 268 and 270 are interconnected and connected to a collector of the normally blocked transistor 251. Negative terminals of the sources 265, 267 and 269 are also interconnected and connected to a collector of the normally conductive transistor 252. The positive terminals of the sources are connected in pairs as 269 to 266, 265 to 268 and 267 to 270 and connected respectively to control circuits of gates (transistors) 274, 275 and 276 having the junctions reversed in respect to that of the transistors 271, 272 and 273. The above-mentioned transistors switch the sections 235, 239 and 243 of the electric motors with respect to the power source. Control circuits of the transistors 249–250 and 251–252 are connected to a control device having two galvanically uncoupled outputs 278 and 279. Emitters of the transistors 249–250 and 251–252 are connected to the terminals which are common to power and control circuits of the transistors 271–273 and 274–276 respectively.

Figure 28:
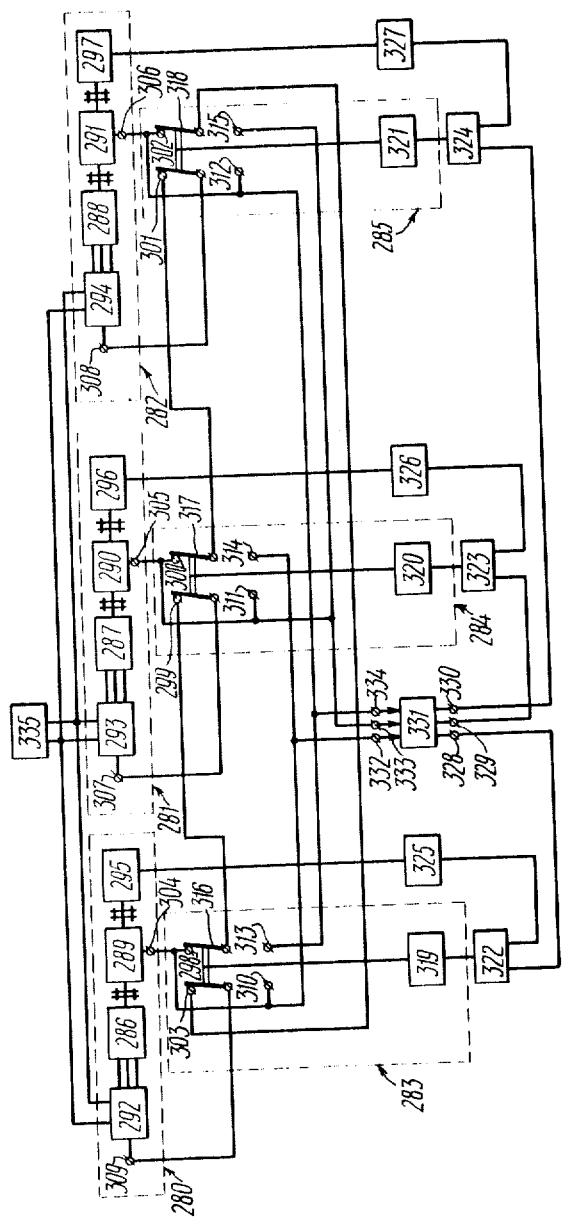
FIG. 28 is a block diagram of an electric drive with three gate-controlled electric motors, each provided with two-position multichannel controlled relay.

FIG. 28 illustrates a block diagram of an electric drive having three gate-controlled electric motors 280, 281 and 282 provided with two-position multichannel controlled relay 283, 284 and 285.

The gate-controlled electric motors comprise synchronous machines 286, 287, 288 with rotor position sensors 289, 290, 291, gate switching means 292, 293, 294 and controlled-parameter sensors, e.g. tachometers 295, 296 and 297. Outputs 304, 305, 306 of the sensors 289, 290, 291 are connected through normally opened circuits 298, 299, 300, 301, 302, 303 to inputs 307, 308, 309 of the switching means 292, 293, 294. Outputs 304, 305, 306 of the sensors 289, 290, 291 through normally opened circuits 310, 331, 312 of the relay 283, 284, 285 are connected to the inputs 309, 307, 308 of their own switching means 292, 293, 294. The output 306 of the preceding (according to the ring circuit) sensor 291 via the normally opened circuit, e.g. the circuit 313 of the relay 283, is connected to the input 307 of the next switching means 293, thereby forming a ring circuit for the electric drive consisting, in this case, of two electric motors. Other electric connections are identical. The switching of the normally closed and normally opened circuits in the relay is preformed by the switching means 316, 317, 318 interacting with the control circuits 319, 320, 321. The control circuits 319, 320, 321 for each of the relay 283, 284, 285 are connected to the outputs of coincidence circuits 322, 323, 324. Tachometric devices 295, 296, 297 are connected to two inputs in each of said coincidence circuits through threshold elements 325, 326, 327 and outputs 328, 329, 330 of the detector 331 which detects the delayed-by-phase rotor of the rotating synchronous machines. Inputs 332, 333, 334 of the detector 331 are connected to the outputs 304, 305, 306 of the sensors 289, 290, 291. The detector 331 is made in the form of a logic unit providing a signal at the output thereof from the outputs 328, 329, 330 which has at their respective inputs 332, 333, 334 a signal delayed by phase.

the electric drive is supplied from a power source 335.

Figure 29:
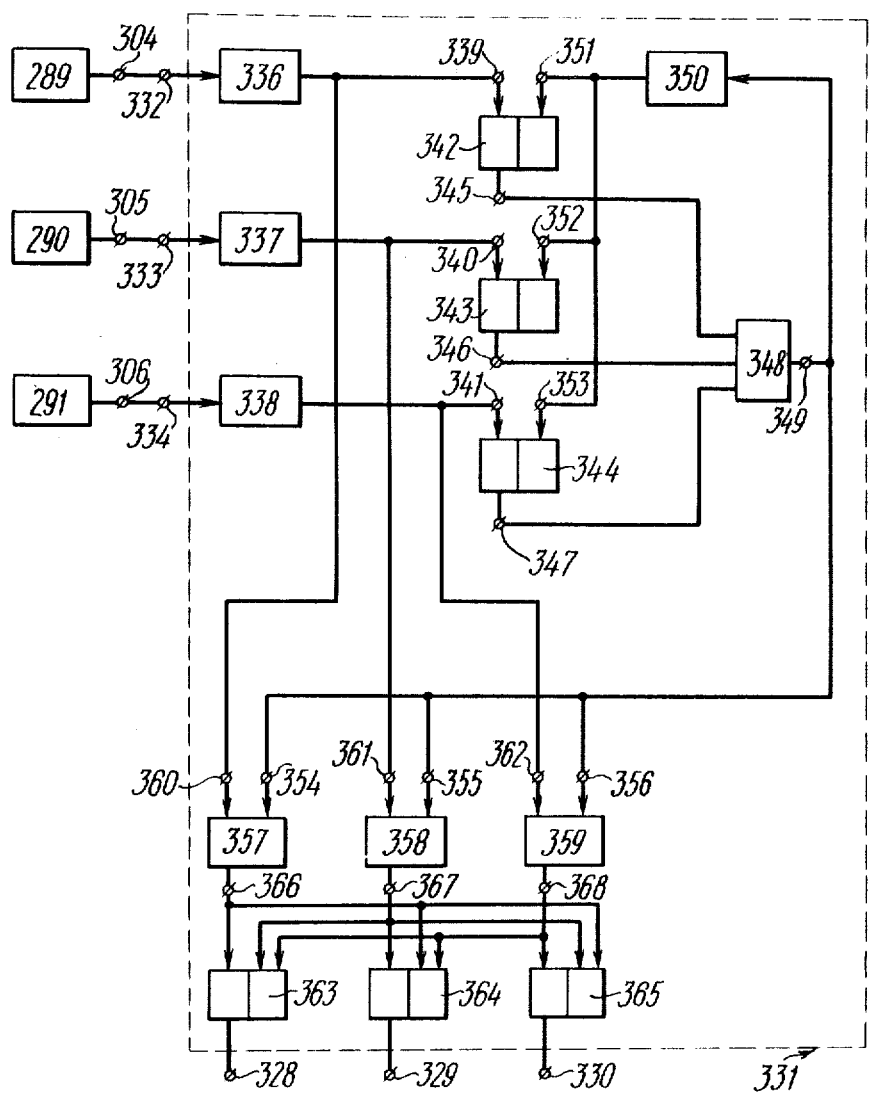
FIG. 29 is a schematic representation of a sign-based phase difference detector for signals generated by rotor position sensors.

A schematic representation of a detector determining delayed-by-phase rotor of the rotating synchronous mahcines is shown in FIG. 29. Inputs 332, 333, 334 of the detector 331 are connected to outputs 304, 305, 306 of sensors 289, 290, 291. The detector 331 consists of differential circuits 336, 337, 338 with outputs of said circuits being connected to inputs 339, 340, 341 of static triggers 342, 343, 344. Outputs 345, 346, 347 of said triggers are included in a coincidence circuit 348. An output 349 of the coincidence circuit 348 is connected through a delay circuit 350 to the second inputs 351, 352, 353 of the triggers 343, 343, 344. Furthermore, the output 349 of the coincidence circuit is connected to the first inputs 354, 355, 356 of the remaining coincidence circuits 357, 358, 359, the second inputs 360, 361, 362 of said circuits being connected to outputs of the differential circuits 336, 337, 338.

Three triggers 363, 364, 365 are provided at an output of the detector with the first and the second inputs of said triggers being connected to outputs 366, 367, 368 of the coincidence circuits 357, 358, 359. This connection is accomplished so that each of said ouputs 366, 367, 368 is connected to the first input of one of the triggers and to the second inputs of the rest two triggers. Outputs of the triggers 363, 364, 365 comprise inputs 328, 329, 330 of the detector 331.

The principle of the operation of the electric drive made according to the invention may be understood from the description of its structure (FIG. 1). The switching for armature winding sections in each synchronous machine 2 included in the gate-controlled electric motor 1 is performed via the gates of the gate switching means 5 by signals generated in the rotor position sensor 4 of the subsequent synchronous machine.

Taking into account the fact that the first ouput and, as a modification, the second output 10 of the rotor position sensor in the latter synchronous machine are necessarily connected respectively to the switch on control circuit 6 and to the switch off control circuit 7 used to switch the gates of the switching means in the first synchronous machine, there will be always kept a constant rotational frequency in the completed electromechanical ring system. At any loading torques the rotors of the synchronous machines will be rotated synchronously but not cophasally. The rotational speed of the rotors with the use of identical gate-controlled electric motors will depend on the most loaded electric motor.

It is possible to inclulde into the ring electric drive circuit gate-controlled electric motors having different power, phase and speed characteristics as well as different types of their gate switching means and rotor position sensors. If the ring circuit comprises gate-controlled electric motors having different number of phases or motors controlled from different types of switching means in the case of equal number of phases (that is, from a half-wave or full-wave switching circuit), then the rotor position sensor mounted on the shaft of the synchronous machine should have a number of outputs equal to that of the gates in the associated gate switching means.

Since the connection of the electric motors into a ring circuit of the electric drive always provides the synchronous rotation of their mechanically uncoupled rotors, the control for this electric drive may be performed by acting only on one of the electric motors. Thus, by means of a single speed governor or speed stabilizator it is possible to control the speed of all the electric motors in the system. This feature makes it possible to simplify the control circuit for the electric drive.

Starting procedure for an electric drive according to the invention is described below with reference to a system comprising two electric motors (FIG. 2). With the commerically available gate-controlled electric motors the creation of such an electric drive presents no special problems. The one necessary thing is to change the electric connections between inputs and outputs in the rotor position sensors and gate switching means. The number of phases, polarity and type of the switching circuits included in the ring circuit of the gate-controlled electric motors appreciably effect the starting and working characteristics of the said motors.

Let us consider the starting procedure of an electric drive comprising two three-phase electric motors controlled by half-wave switching means (FIG. 3).

When operating individually without the ring circuit, both gate-controlled electric motors rotate in pace in counter-clockwise direction with a phase switching on zero lead angle $\theta$, the sensing elements 24, 25, 26 controlling the gates 32, 33, 34 adapted to switch the sections 13, 14, 15, while the sensing elements 21, 22, 23 control the gates 29, 30, 31 adapted to switch the sections 16, 17, 18.

The position of the inductors 19 and 20 starting may be arbitrary and therefore it is worth to consider such a position which is most difficult from the point of view of starting. Let us assume that the magnetizing force $F_{19}$ of the permanent magnet 19 coincides with the magnetizing force $F_{13}$ of the switched-on section 13 (FIG. 3). The inductor 19 is in "steady dead" zone and the synchronous machine does not develop a torque. The inductor 20 at this moment may take any position, wherein the signal sector 28 overlaps the position of the sensing element 24 which is used to control the gate 32 switching the section 13 in the ring circuit. The signal sector. 27, in turn, overlaps the position of the sensing element 22 which connects the section 17 by means of the gate 30 to the power source 35, the magnetizing force $F_{17}$ of the section 17 having an oncoming direction with respect to that of the magnet 20 (FIG. 4). At this latter case the inductor 20 is in "unsteady dead" zone and the synchronous machine again does not develop a torque. Six of such positions (when one gate-controlled electric motor is in the "steady" and another one in the unsteady dead zones may be found for the drive consisting of two three-phase one-wave gate-controlled electric motors with the number of pole pairs $p=1$ and $\theta=0$, said motors being connected in the ring circuit. Now, suppose that by means of any auxiliary device such as a permanent magnet it has been possible to eliminate the above-described positions and the inductor 20 takes any position within the limits of overlapping the sensing element 24 by the signal sector 28, e.g. the axis of the inductor 20 extends vertically. Then a torque is developed by the electric motor and the inductor 20 is rotated in the clockwise direction so that the magnetizing force $F_{20}$ tends to coincide with the magnetizing force $F_{17}$ of the switched-on section 17. Until the inductor 20 is turned through 60° of an electrical angle (60 el. degrees), the sensing element 24 will be overlapped and the section 13 will be switched on. As soon as the inductor 20 is turned through this angle, it will overlap the sensing element 16, thereby switching on the section 15 by the gate 34 (FIG. 5). Now, the magnetizing force $F_{19}$ of the magnet 19 interacting with the magnetizing force $F_{15}$ of the switched-on section 15 (FIG. 5) develops a torque and the inductor 19 will rotate in the clockwise direction. After the inductor 19 has been rotated through 30 el. degrees, the sensing element 21 will be overlapped and the gate 29 will switch on the section 16 (FIG. 6). At this moment the magetizing force $F_{20}$ of the magnet 20 will take the direction opposite to that of the magnetizing force $F_{16}$ induced by the switched-on section 16. Passing by inertia beyond this unsteady dead zone, the electric motor begins to develop a torque. Both inductors will be rotated through 90 el. degrees and will take the position shown in FIG. 7. The sector 28 in this case overlaps the sensing element 25, thereby switching on the section 14.

However, since the electric motor develops the torque, the inductor 19 continues to rotate in the clockwise direction. Then the switching procedure is repeated. If initially at the starting moment the inductor 20 takes a position shifted with respect to that illustrated in FIG. 3 in the counter-clockwise direction providing that the sensing element 24 is kept overlapped by the signal sector 28, the correlated rotation of the inductors 19 and 20 will begin in the counter-clockwise direction. Let us assume that the electric motor, which at the starting moment was in the steady dead zone, is a driven motor while the other one is a driving motor. Then the switching of the driven motor sections is performed with a delay by $\theta=30$ el. degrees, while the switching of the driving motor sections is performed with an advance by $\theta=30$ el. degrees. The constant angle of 150 el. degrees is maintained between the axes of the inductors 19 and 20 during the rotation thereof in the clockwise direction, while during their rotation in the couter-clockwise direction the angle between the axes of the inductors will be $-$ 30 el. degrees.

In order to provide starting, unidirectional rotation and normal operation for a three-phase half-wave gate-controlled electric motors included in the ring circuit, it is necessary to shift the sensitive elements of the sensors in said motors through angles $\theta_{19}=\pm(10-20$ el. degrees) and $\theta_{20} = \pm(10 + 20$ el. degrees). The negative sign ($-$) shows that the sensors are shifted in the direction opposite to that assumed by the electric motors during their individual operation without the ring circuit. In this case both electric motors rotate concordantly and in the clockwise direction with the constant angular shift between the inductor axes of about 150 el. degrees.

Let us consider now the operation of the system comprising two gate-controlled electric motors with four-phase half-wave switching means (FIG. 8), said motors being connected in the ring circuit shown in FIG. 2.

For these electric motors the adjustment procedure during the individual operation thereof without the ring circuit as well as the starting procedure are identical to those described above with respect to the three-phase gate-controlled electric motors. When operating individually the four-phase gate-controlled electric motors with $\theta=0$ and $p=1$, after connection into a ring circuit, would have eight positions wherein one of the motors is in the steady and another in unsteady dead zones. If in this situation the inductor of the driving electric motor is brought out of the unsteady dead zone, the motors will rotate in pace in a clockwise direction with the constant shift between the inductor axes equal to 135° and during a counter-clockwise rotation with the shift of 45° respectively. To ensure in the ring circuit the start unidirectional rotation and normal operating conditions for the four-phase half-wave gate-controlled electric motor, it is necessary to shift the sensitive elements of the electric motor sensors respectively through the angle $\theta_{46} = \pm (15-30)$ el. degrees and the angle $\theta_{47}$ 32 $\pm (15-30)$ el. degrees as compared to the zero angle during the individual operation of the motors without the ring circuit. In so doing the electric motors rotate in pase in a clockwise direction, the constant shift between the inductor axes is equal to 135°. In general case, the reverse electric motors is performed by rotating one of the sensors through the angle 180 el. degrees.

Considering in a similar manner the start of the electric drive made in accordance with the present invention, it is possible to determine and to formulate the conditions which are both necessary and sufficient for starting the gate-controlled electric motors of different types. The proper choise of the phase switching-on lead angle $\theta$ appreciably affects the electro-mechanical characteristics of the electric drive. There as well defined optimum values for the phase switching-on lead angle $\theta$ with regard to the different parameters of the electric drive such as efficiency, rigidity factor, maximum power, etc. This feature, howeve, is beyond the scope of the invention since it may be defined as the choice of the particular operating conditions for the electric drive.

By adjusting the phase switching-on lead angles $\theta$, it is always possible to select such values thereof at which the switching of the sections, such as the sections 13 and 16 of the first and the second electric motors (FIG. 3) rotating with equal loading torques, takes place in a neutral zone (the dotted line in FIG. 9). If in this case the load acting on the first electric motor is increased and the load acting on the second electric motor is decreased, then with unchanged position of the sensors the switching of the most loaded motor will be in advance with respect to the neutral zone and is characterized by the lead angle ($-\theta_{13}$) while the switching of the lest loaded motor is characterized by the delay angle ($\theta_{16}$). This leads to the increase of a current both for the loaded motor ($I_{13}$) (and this is a necessary action) and for the unloaded motor ($I_{16}$) (and this is an objectionable action as it reduces the power characteristics of the electric drive). The above-mentioned negative action may be eliminated if the blocking of the gates in the gate switching means is controlled by signals of the rotor position sensors of its own synchronous machine while the opening of said gates is controlled by signals generated by rotor position sensors of that synchronous machine which is subsequent according to the ring circuit (FIG. 10). One embodiment of such a diagram for the electric drive according to the invention is shown in FIG. 11.

The device operates in the following manner. When a control signal is received, e.g. from the sensitive element 68, the pulse shaper 86 generates a pulse signal fed to the trigger 78 and the latter makes the gate conductive with the resulted flow of the current through the section 69. The electric motor develops a torque. The blocking of the gate 74 is controlled by a signal from the shaper 88 which generates a signal switching the trigger 78 to the "zero" state according the trailing edge of a signal from its own inductive sensor 71. The gate 73 operates in the same manner with its triggering according to the leading edge of a signal taken from another sensor 71 through the shaper 87 and with its blocking according to the trailing edge of a signal taken through the shaper 85 from its own inductive sensor 68.

It is possible to use another schematical representations for the electric drive according to the present invention. Specifically, a signal from a tachogenerator mounted on the shaft of the electric motor may be used as the signal defining a position of the rotor of its own electric motor while in case of half-wave switching means said signal may be based on the counter electromotive force induced in the electric motor sections during the idle half cycle.

The reason for the improved operation of such a drive is the following. As it has been mentioned above, it is always possible to select such values for the phase switching-on lead angle $\theta$ which ensure the switching of the sections 66 and 69 of the different electric motors (FIG. 11) rotating with equal loading torques simultaneously and within the neutral zone (as shown by dotted lines in FIG. 12). If now to increase the load acting on the first electric motor and to decrease the load on the second electric motor, then with the unchanged position of the sensors there will be a phase difference in the rotation of the electric motor rotors. However, only the moments of switching-on of the sections 66 and 69 will be changed while the switching them off will be performed as before by signals taken from its own rotor position sensor. As a result, the most loaded electric motor will have the phase switching-on angle for the section 66 increased by $\theta_{66}$ while the same angle for the section 69 of the least loaded motor will be decreased by the angle $\theta_{69}$, the utilized currents $I_{66}$ and $I_{69}$ in both sections being respectively increased and decreased (solid lines in FIG. 12). This action improves the power characteristics of the electric drive and increases its rigidity factor.

However, the electric drive may be accomplished in this form only when it comprises two gate-controlled electric motors controlled by switching meanswith half-wave circuits. The reason for this resides in the fact that the switching-on angle for the most loaded electric motor is increased and in the fact that within the predetermined range of loading torque differences, the full-wave switching means may have the short circuit of the source through the gates belonging to the same section of the synchronous machine.

In view of the above-said, the diagrams of the electric drives illustrated in FIGS. 13, 17 and 21 are of general purpose and may be used for any type of gate-controlled electric motors.

The distinguishing feature of these electric drives consists in that they should be provided with the speed governors 96, 97, 131, 132, 133, 169, 170 for the electric motors and with the sign-based and module-based phase-difference detectors 104, 134, 135, 136, 171 for the signals taken from the rotor position sensors in each pair of the synchronous machines. Depending on power and structure of the used gate-controlled electric motors the speed governors controlling the rotation of the motors may be divided into three groups as given below:

a. supply voltage adjusting means (as shown by 96);

b. current adjusting means (such as shown by 131) for the field winding of the synchronous machine;

c. voltage adjusting means (such as shown by 169) included in the control circuit of the rotor position sensor providing the phase shift of output signals.

The electric drive wherein each of the electric motors is provided with the supply voltage adjusting means operates in the following manner. With the identical gate-controlled electric motors rotating under equal loading torques the switching of sections of the synchronous machines 89 and 90 is performed e.g. with the optimum switching-on lead angles $\theta_0$ (FIG. 14). The rotors of the synchronous machines 89 and 90 rotate cophasally and there is no signal at the output 107 of the module-based phase-difference detector. The control circuits 98 and 99 ensure e.g. conduction of thyristors of the rectifiers 96 and 97 with the equal voltages $U_{96}$ and $U_{97}$ of the rectified three-phase alternative current at the output. The synchronous machines 89 and 90 utilize the equal currents $I_{89}$ and $I_{90}$ with the equal induced counter electromotive forces $E_{89}$ and $E_{90}$. Assume now that the loading torque acting on the shaft of the synchronous machine 90 is decreased. In the electric drive system without speed governors (FIG. 2) a phase difference will occur: the rotor of the synchronous machine 90 will rotate in advance with respect of that of the synchronous machine 89 due to the fact that the switching of the most loaded gate-controlled electric motor is characterized by a negative angle $\theta_{89}$ different from the optimum one, while the switching of the low loaded electric motor is characterized by the angle $\theta_{90}$ of a positive value (FIG. 15). In this case, the least loaded electric motor utilizes an appreciable current $I_{90}$ which reduces the electric drive efficiency. When there is a difference in phases in the electric drive made according to the invention, a signal equal by module to the difference between the signals from the rotor position sensors 91 and 92 and proportional to the value of the phase difference will occur at the output of the phase-difference detector. For the case given, that is when the rotor of the synchronous machine 90 rotates in advance of that of the synchronous machine 89, a voltage will occur at the output 111 of the detector, said voltage ensuring the triggering of the gate 107 connecting the output of the module-based phase-difference detector to the control circuit 99. The supply of the signal to the control circuit 99 leads to delay in phase of control pulses from the thyristors of the rectifier 97 thereby decreasing the rectified voltage $U_{97}$ by the amount $\Delta U$ (FIG. 16). This action reduces the extra torque developed by the synchronous machine 90 and, as a result of this, the amount of the phase difference between the rotating rotors of the synchronous machines 89 and 90. With the sufficient phase-difference amplification factor the amount of a static error $\Delta \theta$ in negligible. When the loading torque on the shaft of the synchronous machine 89 is reduced the output 107 of the module-based phase-difference detector is connected to the control circuit 98 thus reducing the voltage at the rectifier 96.

From the above-said it follows that the function of the speed governor controlling the rotational speed of the gate-controlled electric motor in the electric drive made according to the invention consists in the elimination of the extra torque developed on the shaft of the least loaded electric motor. It is obvious that any other commercially available adjusting means may be used as voltage controllers, said devices being of amplitude or pulse-duration types. Thus, for the transistor half-wave switching means it is expedient to use voltage adjusting devices made in the form of an auxiliary transistor connected in series to the main transistors and of a diode connected opposing to the power source and by-passing the main transistors of the switching means as well as those of the synchronous machine winding sections. Such a controller is similar to the known diagram of a non-reversible pulse stage provided with a direct current commutator motor.

It is advantageous to make the voltage adjusting devices for the full-wave switching means on the basis of the main transistors in the lower or upper arm of the switching means interacting with the pulse-duration modulator.

The sturcture of the electric drive shown in FIG. 17 is completely the same as described above with reference to FIG. 13. The only difference consists in a greater number of the phase-difference detectors which in a general case is equal to $m(m-1)/2$, i.e. to the number of combinations of $m$ gate-controlled electric motors taken by two at a time, and in the change of a type of the governor comprising in this case a current adjusting means, such as shown by 133, included in the field winding circuit of the synchronous machine.

The electric drive of this type operates in the following manner. With the identical gate-controlled electric motors rotating under equal loading torques the switching of sections in the synchronous machines 112, 113, 114 is performed, e.g. with the switching-on lead angles $\theta_o$ (FIG. 18). The rotors of the synchronous machines 112, 113, 114 rotate cophasally and there is no signal at the outputs 143, 144, 145 of the module-based phase-difference detector. The current adjusting means 131, 132, 133 ensure, e.g. such a value of the rated exciting current which at a given rotational speed corresponds to the predetermined electromotive force E equal for all the synchronous machines used in the electric drive, i.e. $E_{112} = E_{113} = E_{114}$.

With the equal supply voltages the synchronous machines will utilize equal currents $I_{112} = I_{113} = I_{114}$. Assume now that the loading torques on the shafts of the synchronous machines 113 and 114 are decreased, the decreasing of the loading torque acting on the shaft of the synchronous machine 114 being in greater degree than that on the shaft of the synchronous machine 113.

In the electric drive system without speed governors (FIG. 2) a phase difference will occur: in the rotation of the synchronous machine rotors, that is the rotor of the synchronous machine 114 will rotate in advance with respect to that of the synchronous machine 113 while the latter in turn will rotate in advance of the rotor of the synchronous machine 112 with the result that the switching of the most loaded gate-controlled electric motor is characterized by a negative angle $\theta_{112}$ different from the optimum one, while the switching of the low loaded gate-controlled electric motors is characterized by the positive angles $\theta_{113}$ and $\theta_{114}$ respectively (FIG. 19) In this case, the low loaded gate-controlled electric motors utilize appreciable currents $I_{113}$ and $I_{114}$ thereby decreasing the efficiency of the electric drive. In case of difference in phases, in the electric drive made according to the invention signals equal by module to the difference between the signals from the rotor position sensors 115 and 116, 116 and 117, 117 and 118 and proportional to the value of their phase difference will occur at the outputs 143, 144, 145 of the phase-difference detectors. For the case given, that is when the rotor of the synchronous machine 114 rotates in advance of that of the synchronous machine 112, there will be voltage at the outputs 153, 155 and 156 of the phase-difference detectors 134, 135 and 136. Said voltage ensures triggering of the controlled gates 147, 149 and 150 and the signals from the outputs 143, 144 and 145 of the module-based phase-difference detectors will be fed to the inputs of the current adjusting means 132 and 133. Only that signal of those fed from the outputs 144 and 145 which has a greater value will be used as a control signal for the input 133. In the given case this is a signal from the output 145. The valve of the signal from the output 143 to the current adjusting means 132 will be less than that of the signal from the output 145 to the current adjusting means 133. The current adjusting means are made so that the admission of the signal to their inputs leads to the increase in current flowing through the field windings. In this case the current in the field winding 129 is greater than that in the winding 128 while the current in the winding 130, in turn, is greater than that in the winding 129 with the resulted change in values of the counter electromotive forces at a given speed. Since in this case there is a condition $E_{114} > E_{113} > E_{112}$, the utilized currents will be decreased according to the relation $I_{114} < I_{113} < I_{112}$ thereby eliminating the extra torque and ensuring the phase difference compensation (FIG. 20). With the sufficient amplification of the phase-difference signal by the current adjusting means the amount of the static error $\Delta\theta$ is negligible. Thus, in this system a continuous compensation for the phase difference and elimination of extra torque in the less loaded gate-controlled electric motor will occur at any other possible differences in loading conditions of the electric motors.

Any known amplitude or pulse-duration type diagram may be used for the manufacture of the current adjusting means included in the field winding circuits, e.g. a circuit with a positive booster may be used for this purpose.

The structure of the electric drive shown in FIG. 21 is absolutely the same as shown in FIGS. 13 and 17. The only difference consists in the type of the used speed governor which in this case comprises a voltage control device included into the control circuit of the rotor position sensor providing the phase shift between the output signals.

The electric drive operates in the following manner. When identical gate-controlled electric motors rotate under equal loading torques, the switching of sections of the synchronous machines 158 and 159 is performed, e.g. with the optimum angles $\theta_o$ (FIG. 22). The rotors of the synchronous machines 158 and 159 rotate cophasally and there is no signal at the output 174 of the module-based phase-difference detector. Assume now that the loading torque acting on the shaft of the synchronous machine 159 is decreased. In this case a phase difference will occur in the electric drive system without speed governors (FIG. 2), that is the rotor of the synchronous machine 159 will rotate in advance of that of the synchronous macine 158 thereby ensuring that the switching of the most loaded gate-controlled electric motor will be characterized by a negative angle $\theta_{158}$ greater than $\theta_o$ while the switching of the least loaded motor will be characterized by another angle $\theta_{159}$ less than $\theta_o$ (FIG. 23). The deviation of the angle $\theta_{158}$ from the optimum value leads to a decrease in efficiency of the most loaded electric motor and hence of that of the electric drive as a whole. In the electric drive made according to this embodiment, in case of difference in phases, a signal equal by module to the difference between the signals generated by the sensors 160 and 161 and proportional to a value of their phase difference will occur at the output 174 of the phase-difference detector. For the case given, that is when the rotor of the synchronous machine 159 rotates in advance of that of the synchronous machine 158, there will be a voltage at the output 178 of the sign-based phase-difference detector. Said voltage ensures the triggering of the controlled gate 176 connecting the output 174 of the modulebased phase-difference detector to the input of the voltages controlling device 170 in the control circuit of the sensor 161. The voltage controlling device 170 is made so that when a control signal is fed to the sensor 161; a phase shift signal occurs at the outputs of said sensor, the value of this signal ($\theta_{158} - \theta_o$) ensuring the shift in direction of the rotation of the synchronous machine 159. The switching of the most loaded motor will be again performed with the optimum angle while the switching of the lest loaded motor will be performed with the angle ($\theta_o + \theta_{159} - \theta_{158}$) (FIG. 24).

The consumption of energy in the less loaded gate-controlled electric motor is reduced while the phase difference between the rotors of the synchronous machines 158 and 159 is kept equal to ($\theta_{158} - \theta_{159}$).

The selection of the diagram for the rotationary speed governor depends mostly on the power and rotational speed of the gate-controlled electric motor. In large power electric motors (with the power exceeding 5 kwt) it is expedient to use a voltage controlling device included in the circuit of the rotor position sensor providing a phase shift signal at the output thereof. For large and average power electric motors wherein contactless synchronous machines with electromagnetic excitation are used it is advisable to employ the current adjusting means included in the field winding circuit. The use of the voltage controlling devices is advantageous primarily for light power motors since the operation of these devices is associated with the control of the mainstream power flow. However, the voltage controlling device may find its use also in the average power electric drives comprising magnetoelectric synchronous machines and having no rotor position sensors with output signal phase control.

Furthermore, it is possible to use two or three speed governors simultaneously, said governors being, e.g. current adjusting means included in the circuit of a field winding and a voltage controlling device in the control circuit of the sensor providing the output signal phase shift. One channel may be used for rough control while the other may be used for fine control, thereby increasing the stability and accuracy for automatic control of the electric drive system comprising a number of gate-controlled electric motors.

The use of the electric drives with rotational speed governors is justified for those cases where the loading torques acting on the gate-controlled electric motors during their operation vary appreciably. However, known in the art are cases where motor loading torques vary very little during the operation of said motors. It is expedient to provide such electric drives (FIG. 25) with two-position multichannel controlled relay 182 converting the ring circuit of the electric drive into locally-closed circuits of the gate-controlled electric motors 179, 180, 181 when the switching means 189, 190, 191 are controlled via the normally opened circuits 195–204, 196–205, 197–206 of the relay 182 by signals fed from the rotor position sensors 186, 187, 188 of their own synchronous machines 183, 184, 185.

The necessity to use such a relay is determined by the fact that values of phase switching-on lead angles which are chosen with regard to reliable starting conditions and unidirectional rotation appreciably differ from values of switching-on lead angles $\theta$ which are optimum, e.g. from the efficiency point of view. This discrepancy in optimum values of the angles reduces the power characteristic of the electric drive. The use of the above-mentioned relay eliminate this disadvantage since the start of the gate-controlled electric motors may be performed in the locally-closed circuits with the subsequent switching of the motors to the electric drive system with the ring circuit. In the latter case the values of a phase switching-on lead angles $\theta$ may be determined with regard to the starting conditions rather than by conditions with regard to the maximum efficiency.

If the relay 182 is provided with a control device, it is possible to carry out a number of special regimes and to increase the reliability of the electric drive operation. Thus, if the control device is made in the form of squarewave pulse generator included in a backfeed circuit controlling the rotational speed for one of the gate-controlled electric motors, then it is possible to ensure both the reliable starting of the electric drive with periodical speed synchronization for the gate-controlled electric motors and the high efficiency of the electric drive under steady operating conditions. In this case an impulse period for signals fed from the generator should be lower, e.g. by an order, than the least one of the electromechanical time constants of the electric motors.

Upon reaching the predetermined rotational speed, e.g. the speed approximating the rated one, the squarewave pulse generator is switched off through the backfeed circuit and the electric drive operates in the ring circuit showing a high power performance.

Other embodiments of the control device are possible, said embodiments providing different functions. The control device may comprise, e.g. a relay element included in the speed or current feedback control circuit. Upon exceeding the predetermined level, e.g. in the case of stalling one of the electric motors, the relay element is actuated by the feedback signal and switches the electric motors to the locally-closed circuits thereby ensuring the normal operating conditions for other electric motors. If the overloading is accidental, then the relay element will be switched off since the rotational speed will increase and the relay will again switch the electric motors to the ring circuit. If the reasons of the overload are not eliminated, then the reclosing will fail, but if the rotational speed control is carried out with regard to the most loaded electric motor, then there will be no repeated switching at all. With the use of the conventional control circuits it is possible to ensure at all times the switching (inter locking) of the relay element in the case of unfavourable reclosing.

A connection of the control device to the output of a programming device will make it possible to ensure a great variety of control conditions for the electric drive. The device in accordance with this embodiment when used in combination with numerical control may in a very simple way to carry out the pulse synchronization, e.g. of multiple rotational speeds, control of the efficiency in complex coordinated drives individual starting of electric motors with the subsequent synchronization thereof, etc.

It is also possible to use such a relay in the electric drive shown in FIG. 10. In this case the number of channels of the relay may be decreased, since gate switch-off control circuits for the switching means are connected constantly to its own sensor. The only necessary thing is to switch the gate switch-on control circuits.

The proposed relay may be manufactured on the basis of the conventional switching elements (such as contact relay, transistors, thyristors, etc.). The distinguishing feature of the relay referred to is its multichannel capacity measured as the product of the number of channels in the rotor position sensor and the number of electric motors. In some particular cases the relay circuit may be simplified. It is proposed to make the relay on the bases of two semiconductor switching devices (e.g. with the use of transistors) for a set of gates having a common terminal in the power and control circuits (FIG. 26).

The device operates in the following manner. When the normally conductive transistor 221 is opened, the output of each sensor is connected to the control circuits of the switching means in the subsequent (according to the ring circuit) electric drive. The source 229 controls the operation of the transistor 223 while the sources 231 and 233 control the transistors 224 and 222 respectively. The sources 228, 230 and 232 have no effect on the operation of the electric motors. The electric drive operates in the ring circuit.

When the normally blocked transistor 220 is conductive, the output of each of the sensors is connected to the control circuits of its own switching means. The source 228 controls the operation of the transistor 222 while the sources 230 and 232 control the transistors 223 and 224 respectively. The sources 229, 231 and 233 have no effect on the operation of the electric drive. The electric motors operate in the locally-closed circuits.

The principle of the operation of the relay comprising full-wave switching means (FIG. 27) is the same as described above. When the normally conductive transistors 250 and 252 are in the conductive state, the output of each of the sensors is connected to the control circuits of the switching means in the subsequent (according to the ring circuit) electric motor. The sources 259 and 265 control the operation of the transistors 272 and 275 while the sources 261, 267 and 263, 269 control the transistors 273, 276, and 271, 274 respectively. The sources 260, 262, 264, 266, 270 have no effect on the operation of the electric motors. The electric drive operates in the ring circuit. When the normally blocked transistors 249 and 251 of the relay are conductive, the output of each of the sensors is connected to the control circuits of its own switching means. The source 260 and 266 control the operation of the transistors 271 and 274 while the sources 262, 268 and 264, 270 control the transistors 272, 275 and 273, 276 respectively. The sources 259, 261, 263, 265, 267, 269 have no effect on the operation of other electric motors, each included in a locally-closed circuit.

The structure of the electric drive disclosed with reference to FIG. 25 is a particular case of an automatic control system for coordinated electric drive, the more general case comprising selective exclusion of one or several electric motors from the ring circuit of the electric drive while the rest of the electric motors in the latter case being included in the ring circuit. To this end each electric drive should be provided with two-position multichannel relays 283, 284, 285 (FIG. 28) performing the operation described above.

The operation of the device is clear from the above description. The switching means 316, 317, 318 of the relay 283, 284, 285 in the position shown (FIG. 28) switch the gatecontrolled electric motors 280, 281, 282 to the ring circuit of the three motor electric drive system. If now the switching means are switched to the lower position (according to the drawing), then the gate-controlled electric motor 280 will be included in the locally-closed circuit since the output 304 of its rotor position sensor 289 is connected to the input 309 of its own switching while the other two electric motors 281 and 282 will be connected in the ring circuit of the two motor electric drive system. The output 305 of the sensor 290 is connected to the input 308 of the switching means 294 while the output 306 of the sensor 291 is connected to the input 307 of the switching means 293.

The aforementioned conclusion with respect to the use of such relays for the electric drives shown in FIG. 10, is valid also for this case.

The provision of the two-position multichannel relay in each of the gate-controlled electric motors makes it possible to increase the reliability of the electric drive due to the exclusion of the damaged electric motor while maintaining other motors synchronously rotating.

The phase delay of a rotor of one motor with respect to the rotors of other synchronous machines in the electric drive may serve as a reliable information for detecting the damaged or overloaded electric motor. This feature in combination with the controlled parameter sensor makes it possible to reveal the damaged electric motor and to exclude it from the ring circuit. This electric drive operates in the following manner (FIG. 28).

If the loading torques on the shafts of the gate-controlled electric motors 280, 281, 282 do not exceed the predetermined value, the rotational speed of the electric motors is in excess of the permissible one and there are no signals at the outputs of the threshold circuits 325, 326, 327. The signal indicating that the rotor of the synchronous machine 289 is delayed by phase from the rotors of other machines will appear at anyone of the outputs, e.g. at the output 328 of the detector 331, said delay resulting from the fact that the loading torque on this electric motor is greater than those on the other electric motors of the drive. The coincidence circuit receives a signal from the output 328 but does not receive a signal from the threshold element 325. In this case the coincidence circuit does not fire and the control circuit 319 of the relay 283 is de-energized. There is no change in the coordinated electric drive.

Assume now that the loading torque, e.g. the torque on the shaft of the synchronous machine 290, has exceeded the predetermined value. Signals will be shown at two inputs of the coincidence circuit 323. The first (the first in time, since the phase difference occurs much earlier than the speed reduction) signal is fed from the output 329 of the detector 331, while the second signal is fed from the output of the tachometrical device 296 via the threshold element 326. The coincidence circuit 323 is fired and energizes the control circuit 320. The switching means 317 of the relay 284 close the normally opened circuits 311 and 314. In this case the output 305 of the sensor 290 would be connected to the input 307 of its own switching means via the circuit 311 while the output 304 of the preceeding sensor 389 via the circuits 314 and 301 would be connected to the input 308 of the subsequent switching means 294 thereby forming a ring circuit of the two motor electric drive. With use of the known protective relaying it is possible to reclose the circuit. If the overloading is accidental, the normal operation will be resumed. If the gate-controlled electric motor is damaged, then after the second unsuccessful attempt to switch it on the motor will be completely switched off.

The above-given description concerns an embodiment of the device which makes it possible to detect the delayed-by-phase rotor of the synchronous machine. The device operates in the following manner. Signals from the rotor position sensors 289, 290, 291 after differentiation of the leading edge thereof in the differential circuits 336, 337, 338 are fed to the inputs 339, 340, 341 of the triggers 342, 343, 344 thereby converting them into state "1". A signal will be shown at the output 349 of the coincidence circuit 348 after the passing of the last signal from the sensor 289, that is from the delayed-by-phase rotor of the synchronous machine, to the output 349 of the coincidence circuit 348. The signal from the output 349 of the coincidence circuit 348 will switch the triggers 342, 343, 344 to their initial state 0 through the delay circuit 350. At the same time, said signal from the coincidence circuit is fed to the first inputs 354, 355, 356 of the coincidence circuits 357, 358, 359 which have previously received only the signal from the sensor 289. To this moment there will be no signals from the differential circuits 337, 338 at the outputs 361, 362. Thus, the coincidence circuit 357 will be switched on and the signal fed from the output 366 of this circuit will converse the trigger 363 to the state 1 and the triggers 364, 365. If, during the operation of the drive, one delayed by phase is the rotor of another synchronous machine, e.g. the rotor with the sensor 290, then the coincidence circuit 358 will be switched on and the trigger 364 will be reversed to the state I. By this moment the tirgger 328 will be switched to the state O while the state of the trigger 365 will remain unchanged. In this way the above described logic unit detects the delayed-by-phase rotor of the synchronous machine. It is apparent that this diagram does not comprise the best solution which is necessary to fulfill the objects stated but rather illustrates one possible example of such a solution. Any other circuits for detectors may be built on the basis of the logic units and triggering devices.

What is claimed is:

1. An electric drive comprising: at least two gatecontrolled electric motors, each of said gate-controlled electric motors comprising a synchronous machine, each of said gate-controlled electric motors having a rotor position sensor mounted on the shaft of said synchronous machine, each of said gate-controlled electric motors being provided with gate switching means, an output of said gate switching means being connected to armature winding sections of said synchronous machine; gates of said gate switching means; gate switch on control circuits for said gate switching means; gate switch off control circuits for said gate switching means, said gate switch on circuit of each of said gate switching means being connected to the first input of said rotor position sensor of each subsequent synchronous machine thereby forming a ring circuit.

2. An electric drive according to claim 1, wherein said gate switch off control circuits for each of said gate switching means are connected to the second output of said rotor position sensor in each subsequent synchronous machine thereby forming a ring circuit.

3. An electric drive according to claim 1, wherein said gate switch off control circuits for each of said gate switching means are connected to the second output of said rotor position sensor of its own synchronous machine.

4. A electric drive according to claim 1 comprising: speed governors controlling the rotational speed of each of said gate-controlled electric motors; module-based and signbased phase-difference detectors for signals from said rotor position sensors of each pair of the correlated synchronous machines, said detectors being $m(m-1)/2$ in number, the output of each of said module-based phase-difference detector being connected to inputs of two of said rotational speed governors of said pair of said correlated synchronous machines through controlled gates, the inputs of said controlled gates being connected to other two outputs of said sign-based phase-difference detector, wherein $m$ is a number of said gate-controlled electric motors.

5. An electric drive according to claim 2, comprising: speed governors controlling the rotational speed of each of said gate-controlled electric motors; module-based and signbased phase-difference detectors for signals from said rotor position sensors of each pair of the correlated synchronous machines, said detectors being $m(m-1)/2$ in number, the output of each of said module-base phase-difference detector being connected to inputs of two of said rotational speed governors of said pair of said correlated synchronous machines through controlled gates, the inputs of said controlled gates being connected to other two outputs of said sign-based phasedifference detector, wherein $m$ is a number of said gatecontrolled electric motors.

6. An electric drive according to claim 2, wherein said gate switch on and off control circuits for each gate switching means are connected respectively to the first and to the second outputs of the rotor position sensors of each subsequent synchronous machine through normally closed circuits of a twoposition multichannel relay while said circuits being connected to the first and the second outputs of the rotor position sensors of its own synchronous machine through normally opened circuits of said relay.

7. An electric drive according to claim 4, wherein said gate switch on and off control circuits for each gate switching means are connected respectively to said first and said second outputs of said rotor position sensors of each subsequent synchronous machine through normally closed circuits of a two-position multichannel relay while said circuits being connected to the first and the second outputs of said rotor position sensor of its own synchronous machine through normally opened circuits of said relay.

8. An electric drive according to claim 6, wherein said circuit controlling the operation of the relay is connected to a square-wave pulse generator.

9. An electric drive according to claim 7, wherein said circuit controlling the operation of the relay is connected to a square-wave pulse generator.

10. An electric drive according to claim 6, wherein said circuit controlling the operation of the relay is connected to a controlled-parameter sensor, said parameter being controlled, e.g. by the current in each of said gate-controlled electric motors.

11. An electric drive according to claim 7, wherein said circuit controlling the operation of the relay is connected to a controlled parameter sensor, said parameter being controlled, e.g. by the current in each of said gate-controlled electric motors.

12. An electric drive according to claim 1, wherein each of said gate-controlled electric motors is provided with a two-position multichannel controlled relay, normally closed circuits of said relays connecting said gate switch on and off control circuits of said gate switching means to said first and said second output of said rotor position sensor of each subsequent synchronous machines thereby forming a ring circuit for the electric drive comprising $m$ gate-controlled electric motors, normally opened circuits of said relays connecting said gate switch on and off control circuits for said gate switching means to said first and said second outputs of the rotor position sensor of its own synchronous machine, while the first and the second outputs of said rotor position sensor of the subsequent synchronous machine are connected to said gate switch on and off control circuits for said gate switching means of the previous synchronous machine thereby forming a ring circuit of the electric drive comprising $(m-1)$ electric motors.

13. An electric drive according to claim 2, wherein each of said gate-controlled electric motors is provided with a two-position multichannel controlled relay, normally closed circuits of said relays connecting said gate switch on and off control circuits of said gate switching means to said first and said second output of said rotor position sensor of each subsequent synchronous machines thereby forming a ring circuit for the electric drive comprising $m$ gate-controlled electric motors, normally opened circuits of said relays connecting said gate switch on and off control circuits for said gate switching means to said first and said second outputs of the rotor position sensor of its own synchronous machine, while the first and the second outputs of said rotor position sensor of the subsequent synchronous machine are connected to said gate switch on and off control circuits for said gate switching means of the previous synchronous machine thereby forming a ring circuit of the electric drive comprising $(m-1)$ motors.

14. An electric drive according to claim 4, wherein each of said gate-controlled electric motors is provided with a two-position multichannel controlled relay, normally closed circuits of said relays connecting said gate switch on and off control circuits of said gate switching means to said first and said second output of said rotor position sensor of each subsequent synchronous machines thereby forming a ring circuit for the electric drive comprising $m$ gate-controlled electric motors, normally opened circuits of said relays connecting said gate switch on and off control circuits for said gate switching means to said first and said second outputs of the rotor position sensor of its own synchronous machine, while the first and the second outputs of said rotor position sensors of the subsequent synchronous machine are connected to said switch on and off control circuits for said gate switching means of the previous synchronous machine thereby forming a ring circuit of the electric drive comprising $(m-1)$ electric motors.

15. An electric drive according to claim 14, wherein said circuit controlling the operation of each of said relays is connected to the output of a coincidence circuit, the first input of said coincidence circuit being connected through a threshold element to a controlled parameter sensor, e.g. by the rotational speed of the electric motor, while the second input of said circuit is connected to the output of the signbased phase-difference detector for signals generated by the rotor position sensors mounted on the delayed-by-phase rotating rotor of the synchronous machine.

* * * * *